United States Patent [19]
Hattori et al.

[11] Patent Number: 5,331,565
[45] Date of Patent: Jul. 19, 1994

[54] CONTROL SYSTEM HAVING OPTIMALITY DECISION MEANS

[75] Inventors: Satoshi Hattori, Hitachi; Shigeru Ueki, Tokyo; Yutaka Saito; Tetsuo Manchu, both of Hitachi; Yasunori Katayama, Mito; Yasuo Morooka, Hitachi; Hiroshi Matsumoto, Ibaraki; Masaaki Nakajima, Hitachi, all of Japan

[73] Assignee: Hitachi, Ltd., Tokyo, Japan

[21] Appl. No.: 133,379

[22] Filed: Oct. 8, 1993

Related U.S. Application Data

[63] Continuation of Ser. No. 490,848, Mar. 9, 1990.

[30] Foreign Application Priority Data

Mar. 17, 1989 [JP] Japan ................................. 1-63743
Mar. 20, 1989 [JP] Japan ................................. 1-66229

[51] Int. Cl.[5] ............................................ G06F 15/00
[52] U.S. Cl. ..................................... 364/472; 395/900
[58] Field of Search .................... 395/3, 51, 61, 900; 364/472, 474.09, 476, 477

[56] References Cited

U.S. PATENT DOCUMENTS

| | | | |
|---|---|---|---|
| 4,475,685 | 10/1984 | Grimado et al. | 364/557 |
| 4,857,106 | 8/1989 | Wakimoto et al. | 395/900 |
| 4,910,692 | 3/1990 | Outram et al. | 364/550 |

*Primary Examiner*—Allen R. MacDonald
*Attorney, Agent, or Firm*—Antonelli, Terry, Stout & Kraus

[57] ABSTRACT

A control system for controlling a plurality of control elements, which are effective to control of a given controlled system, is disclosed. In this control system, a characteristic value representing the characteristic of a given controlled system to be controlled is detected, and respective optimum manipulated variables of the plurality of control elements are derived on the basis of the detected characteristic value. The optimum manipulated variables are derived by setting a plurality of reference patterns representing different features of the characteristic value on the basis of a predicted value of the characteristic value, deriving degree of conviction that the detected characteristic value belongs to each of the reference patterns, presetting rules whereby a manipulated variable of each of the plurality of control elements is determined when the detected characteristic value belongs to each of the plurality of reference patterns, and deriving a manipulated variable of each control element on the basis of degree of conviction that the detected characteristic value belongs to each of the plurality of reference patterns and the manipulated variable determining rule preset with respect to each control element for each reference pattern.

6 Claims, 32 Drawing Sheets

F I G. 1
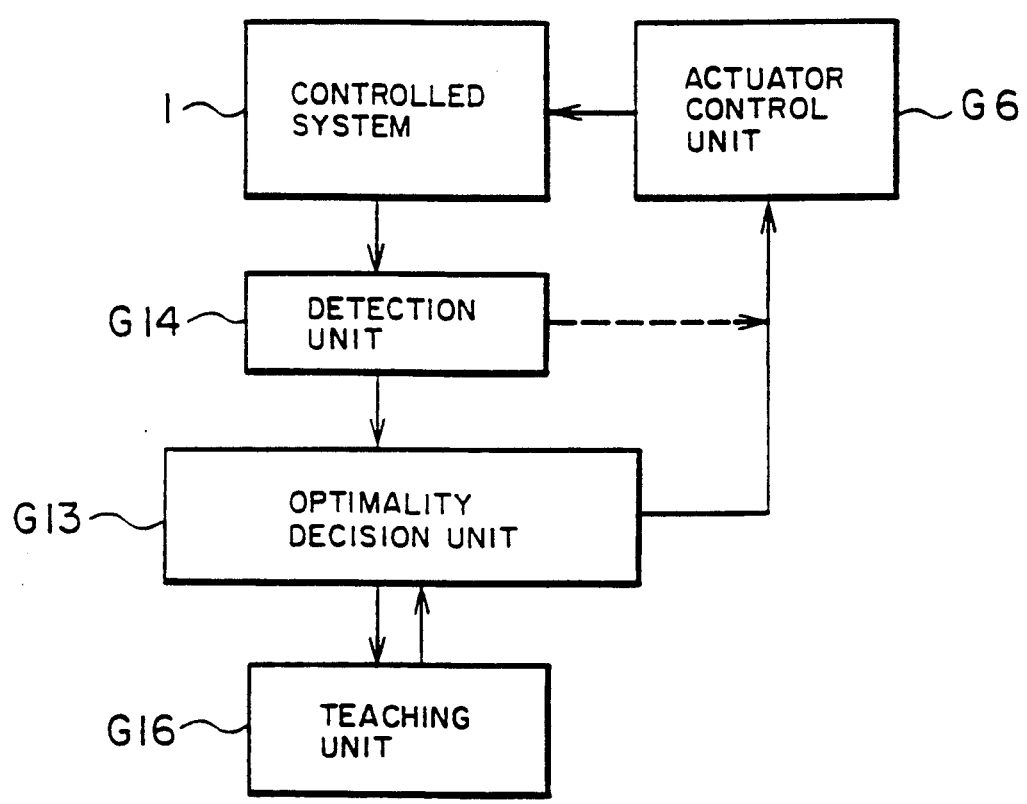

F I G. 9
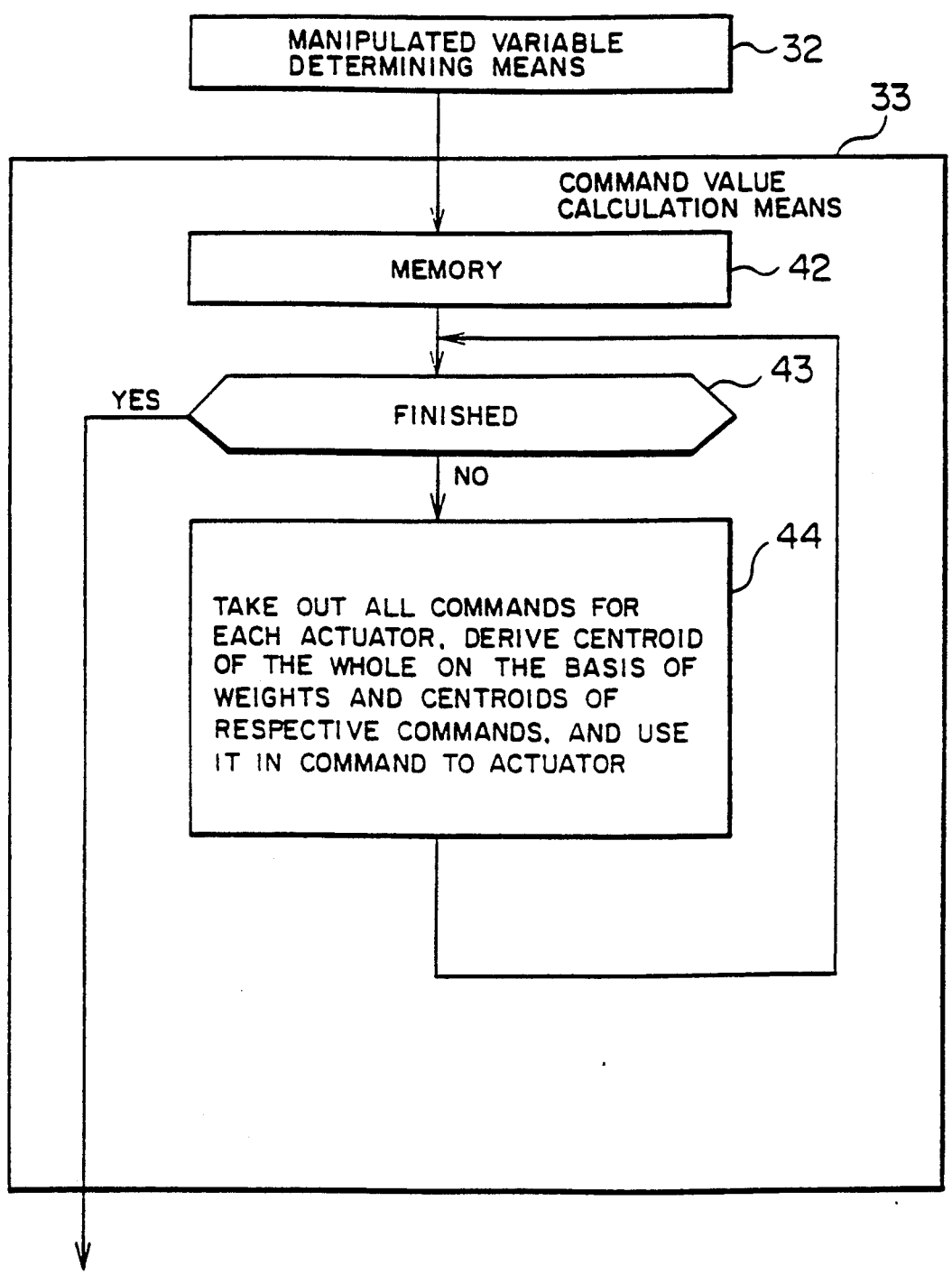

FIG. 18
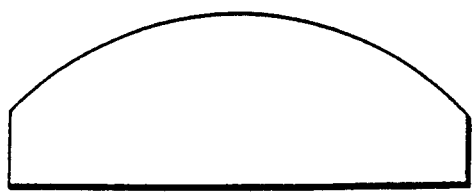
FIG. 19
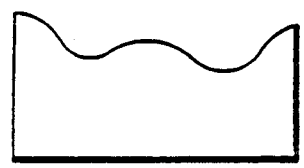 OUTPUT OF ROLLING MILL
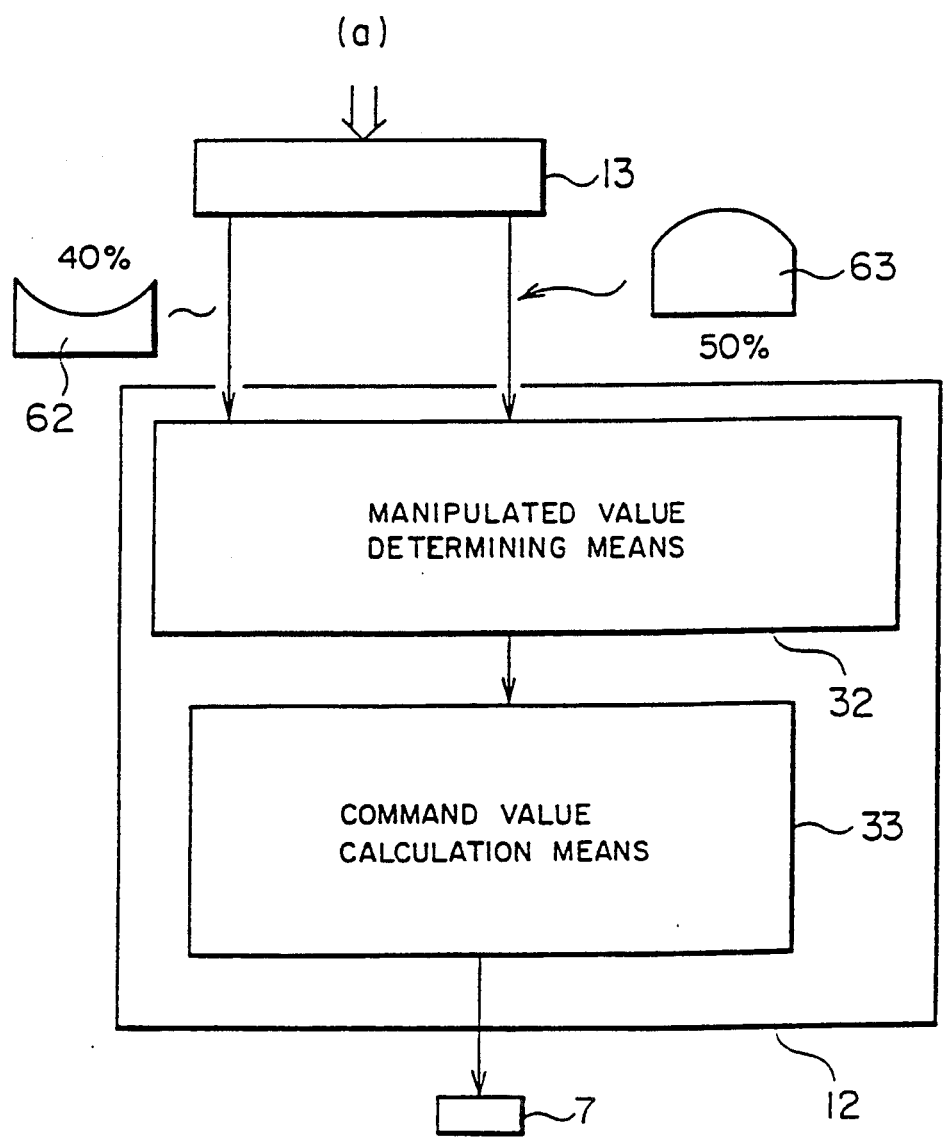

| PREMISE SECTION | CONCLUSION SECTION |
|---|---|
| 80 — CONCAVE | WEAKEN BENDER (S) — 81 |
| 82 — CONVEX | STRENGTHEN BENDER (B) — 83 |
| 84 — LARGER THAN LEFT AND RIGHT VALUES | CENTRAL PART IS LARGER — 85 |
| 86 — CENTRAL PART IS LARGER AND DIFFERENTIAL COEFFICIENT IS POSITIVE | TURN ON COOLANT (B) — 87 |

FIG. 33

INFERENCE RULE BASE 325

| No. | PREMISE SECTION | CONCLUSION SECTION |
|---|---|---|
|  |  |  |
| i | DIFFERENCE BETWEEN THIS POINT AND ADJACENT POINT IS LARGE | MANIPULATED VARIABLE IS LARGE |
| i+1 | DIFFERENCE BETWEEN THIS POINT AND ADJACENT POINT IS MEDIUM | MANIPULATED VARIABLE IS MEDIUM |
| i+2 | DIFFERENCE BETWEEN THIS POINT AND ADJACENT POINT IS SMALL | MANIPULATED VARIABLE IS SMALL |
|  |  |  |
| j | LAST SAMPLING VALUE IS LARGE AND CURRENT SAMPLE VALUE IS SMALL OR MEDIUM | SHAPE CHANGES IN DIRECTION OF IMPROVEMENT |
|  |  |  |
| j+1 | SHAPE CHANGES IN DIRECTION OF AGGRAVATRON | MANIPULATED VARIABLE IS LARGE |
| j+2 | SHAPE CHANGES IN DIRECTION OF IMPROVEMENT | MANIPULATED VARIABLE IS SMALL |
|  |  |  |
| k | ABSOLUTE VALUE OF DEVIATION IS LARGE | MANIPULATED VARIABLE IS LARGE |
| k+1 | ABSOLUTE VALUE OF DEVIATION IS MEDIUM | MANIPULATED VARIABLE IS MEDIUM |
| k+2 | ABSOLUTE VALUE OF DEVIATION IS SMALL | MANIPULATED VARIABLE IS SMALL |
|  |  |  |

CONTROL SYSTEM HAVING OPTIMALITY DECISION MEANS

This application is a continuation of application Ser. No. 07/490,848, filed Mar. 9, 1990.

BACKGROUND OF THE INVENTION

1. Field of the Invention

In a control system for controlling a controlled system activated by a plurality of actuators, the present invention relates to a control system and an optimality decision unit which define optimum controlled variables of individual actuators by synthetically judging the operation of the above described controlled system and a plurality of actuators.

2. Description of the Related Art

In control units of the prior art, control is effected by using a plurality of output signals representing the operating state of the controlled system. In such a scheme that individual outputs are observed to effect control, control becomes local and optimality of the overall system cannot be considered, resulting in a drawback.

In recent years, therefore, it is demanded to derive the overall optimality by using a plurality of signals. By using a rolling mill system, which is so complicated that a single control unit may not control it, as the controlled system, for example, operation of a conventional control unit and a conventional control method will now be described.

From the viewpoint of improvement in quality and productivity of products, improvement in precision of shape control is keenly demanded for a rolling mill which rolls a material to be rolled. In a multistage rolling mill, the shape control of the rolled material is performed by three kinds of control, i.e., control of a work roll bender, an intermediate roll bender and an intermediate roll shifter. Even if the rolled material is a hard material such as stainless steel, a product having a shape which is satisfactory to some degree can be obtained by the above described shape control as described in "Hitachi Review", Vol. 70, No. 6, (June 1988), pp. 81 to 86. In the above described three kinds of shape control, however, a local shape defect such as local elongation caused in the rolled material by deformation of work rolls cannot be corrected. Deformation of rolls is caused by frictional heat and plastic working heat, and it is typically referred to as thermal crown. For correction of local shape defect, it is considered that shape control using coolant control, in which coolant is injected into the work rolls, is effective. The shape control using coolant control is already put into practical use.

However, physical characteristics of rolling largely change depending upon various factors. Even if control is effected by making a control model in the vicinity of a particular operation point, therefore, the model diverges from the actual operation of the rolling mill in many cases. As a result, feedback control, which brings about a fine result if the model is accurate, cannot fully demonstrate its ability and cannot exceed a skilled operator who manipulates the rolling mill in accordance with intuition and experience, resulting in a problem.

In the above described art, attention was not paid to making the best use of know-how of skilled operators and there was a problem of control performance.

SUMMARY OF THE INVENTION

An object of the present invention is to provide a control system having an optimality decision unit which contains know-how of skilled operators and which is excellent in expandability.

In order to achieve the above described object, a control system for controlling a plurality of control elements, which are effective to control of a given controlled system, according to the present invention detects a characteristic value representing the characteristic of a given controlled system to be controlled, and derives respective optimum manipulated variables of the plurality of control elements on the basis of the detected characteristic value. The optimum manipulated variables are derived by setting a plurality of reference patterns representing different features of the characteristic value on the basis of a predicted value of the characteristic value, deriving degree of conviction that the detected characteristic value belongs to each of the reference patterns, setting rules predetermined on the basis of the operator's experience as well, whereby a manipulated variable of each of the plurality of control elements is determined when the detected characteristic value belongs to each of the plurality of reference patterns, and deriving a manipulated variable to each control element on the basis of degree of conviction that the detected characteristic value belongs to each of the plurality of reference patterns and the manipulated variable determining rule set with respect to each control element for each reference pattern.

A skilled operator extracts a characteristic pattern from the controlled variable and performs fuzzy manipulation. In the same way, the degree of conviction (i.e., the degree of certainty or the degree of similarity) of a characteristic pattern is derived by executing calculation for obtaining the sum of products of the controlled variable and passing the result through a nonlinear circuit. On the basis of degrees of conviction of respective characteristic patterns, the manipulated variable of actuators are determined by fuzzy inference. As a result, the control scheme functions like a skilled operator, resulting in fine control performance.

Further, even if know-how of a skilled operator is stored as control knowledge as it is and control is effected by using the knowledge, control performance similar to that of the foregoing description can be obtained.

BRIEF DESCRIPTION OF THE DRAWINGS

FIG. 1 is a diagram showing the configuration of an embodiment of the present invention;

FIG. 9 is a flow chart of operation of command value calculation means;

Figure 15:
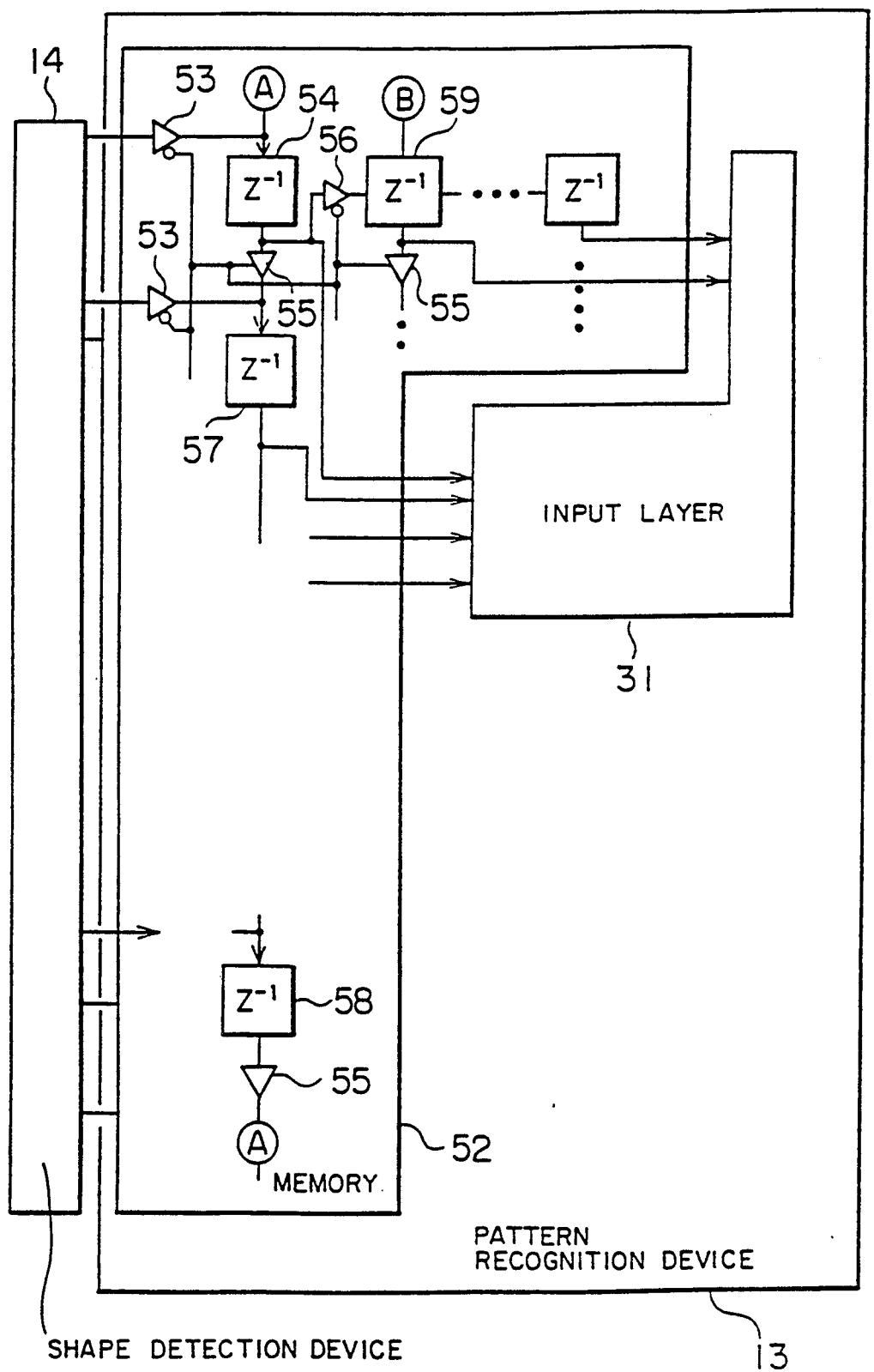
Figure 16:
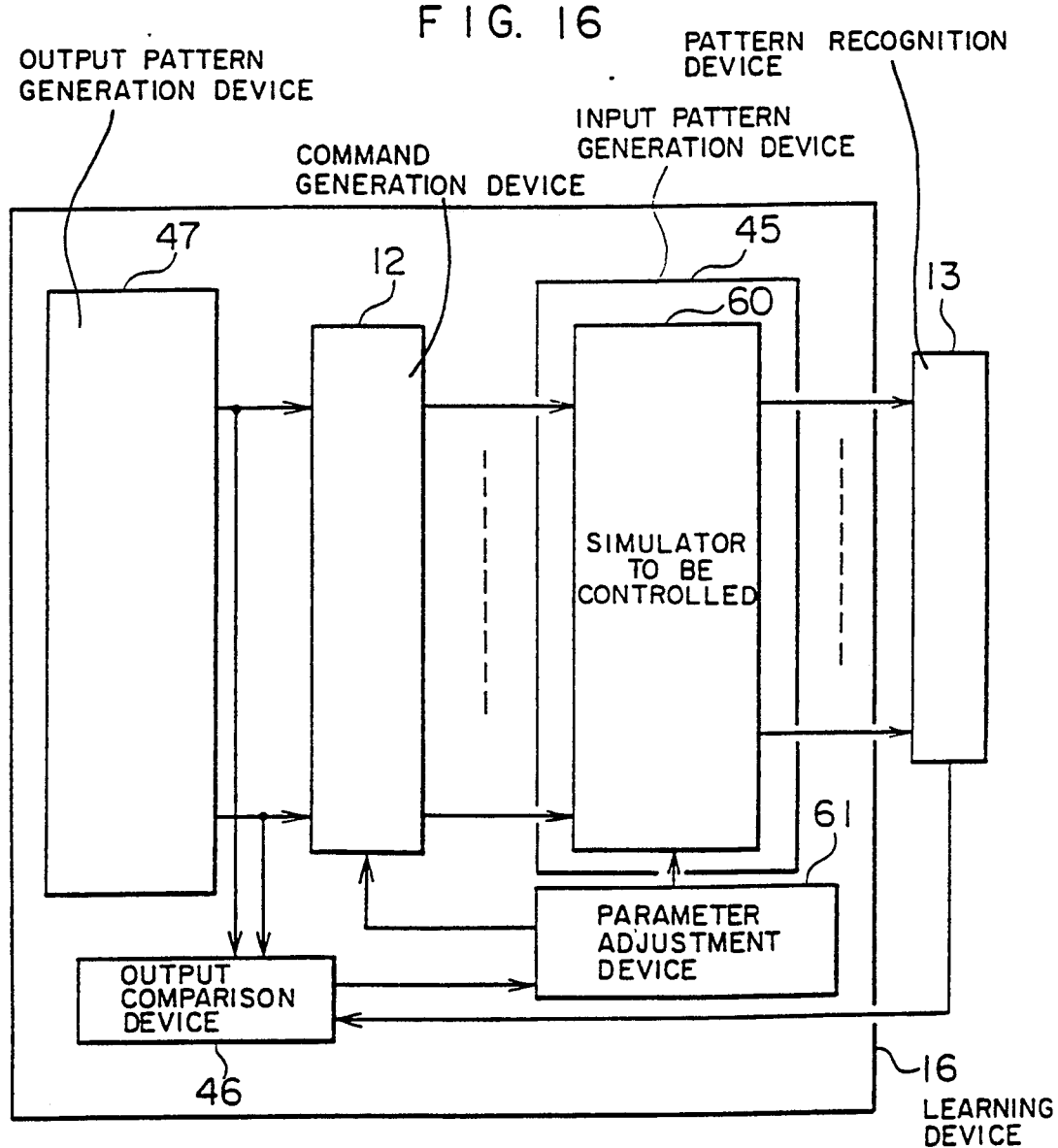
Figure 17:
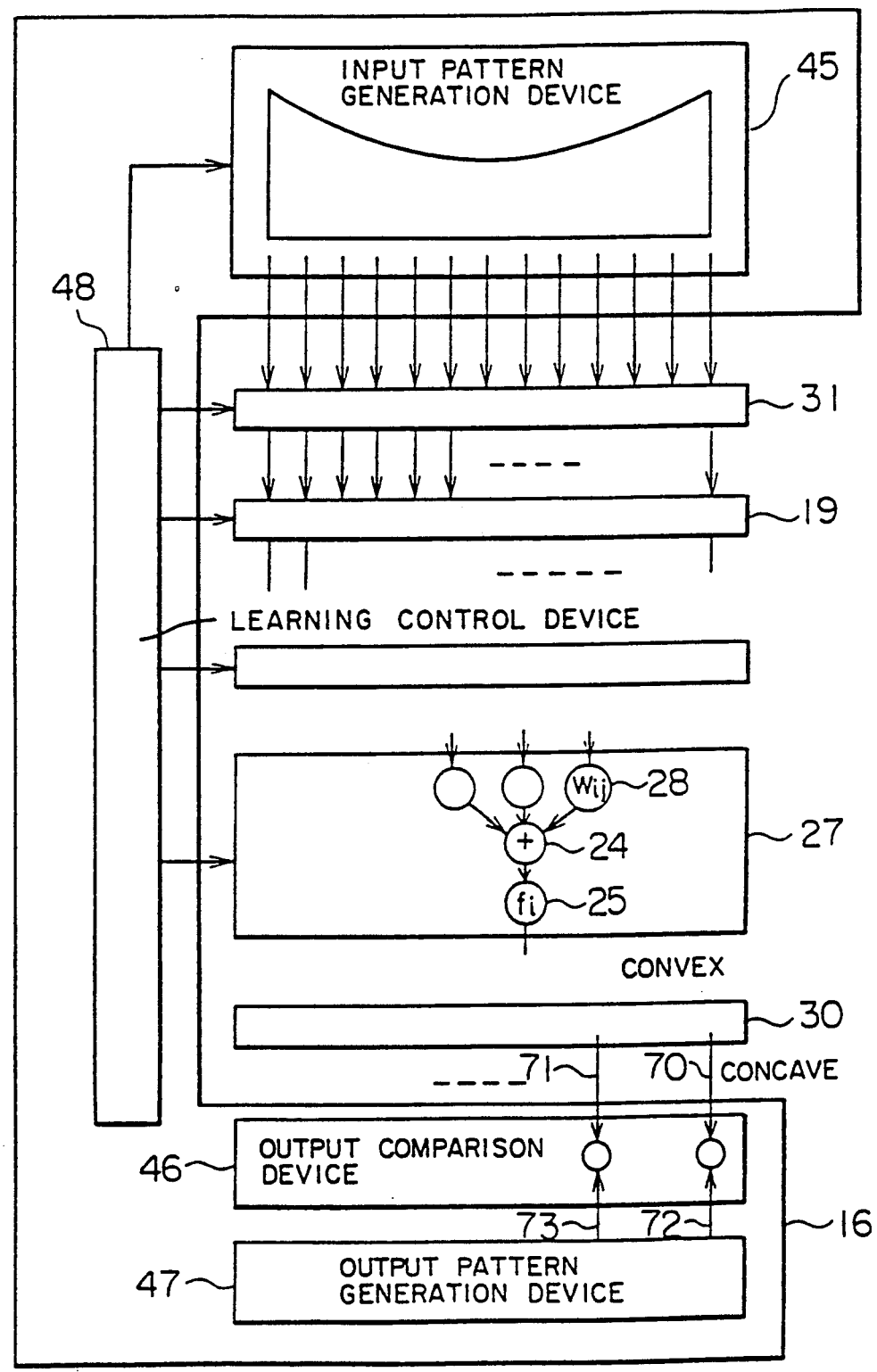
Figure 20:
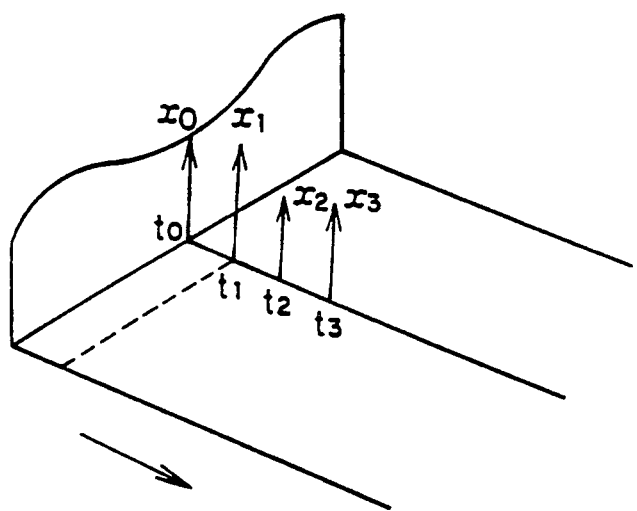
Figure 21:
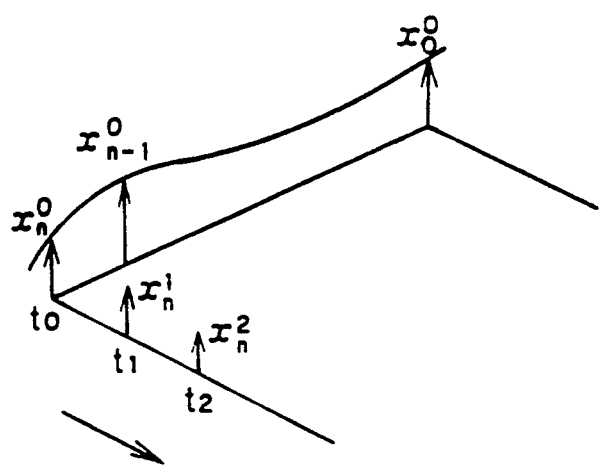
Figures 22, 23:
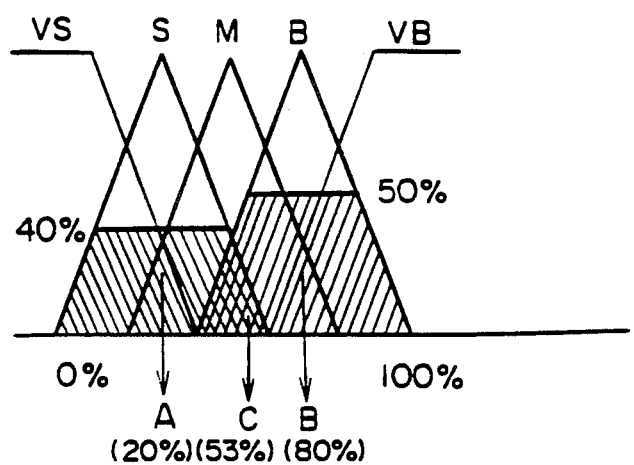
Figure 24:
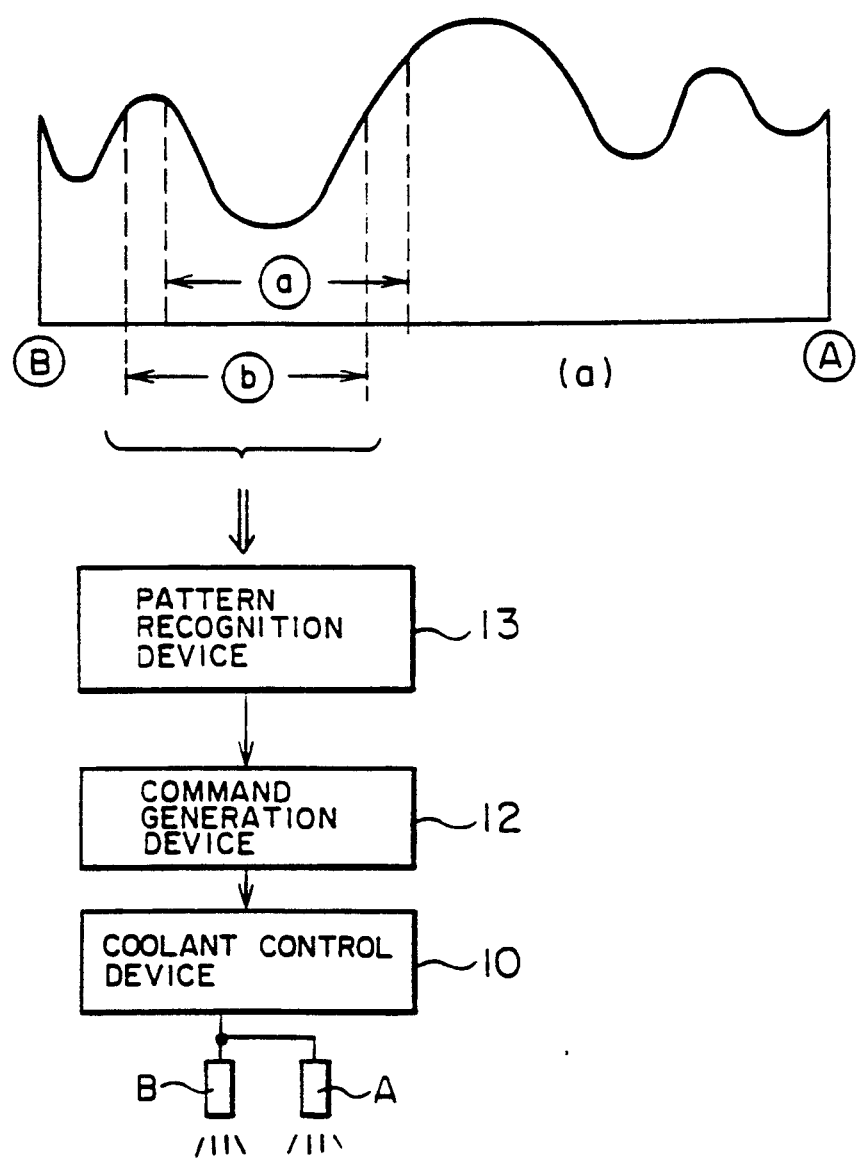
Figure 25:
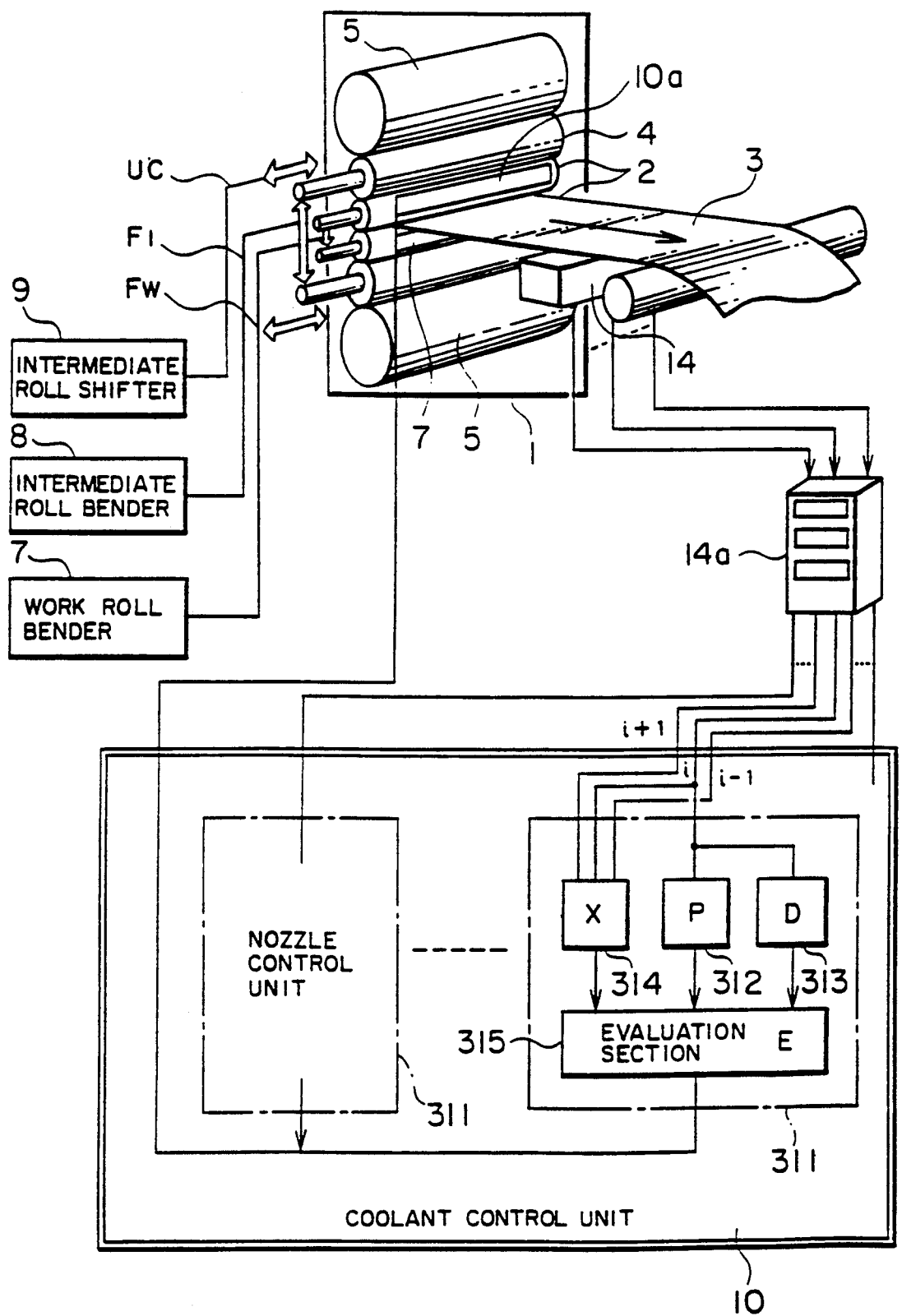
Figure 26:
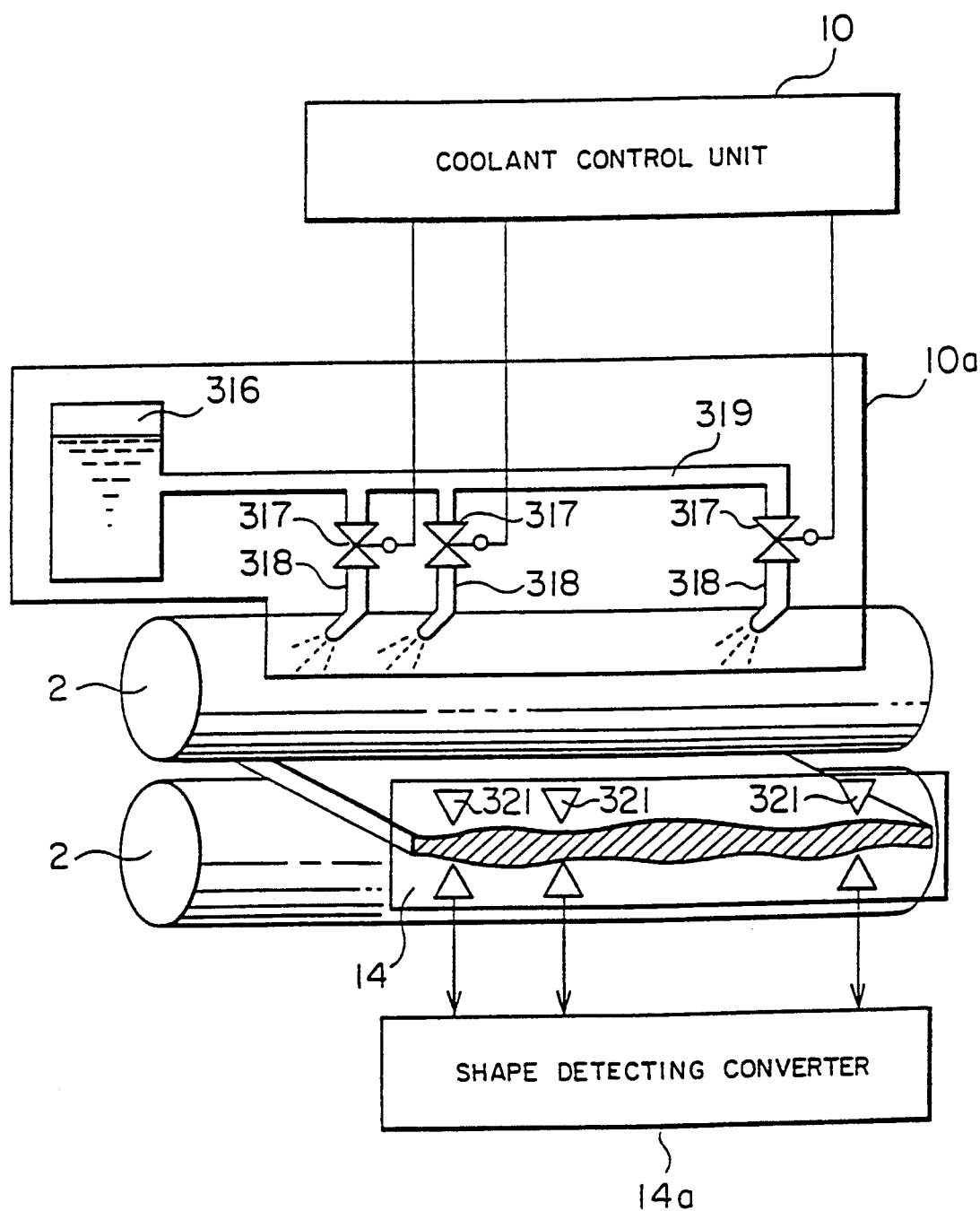
Figure 27:
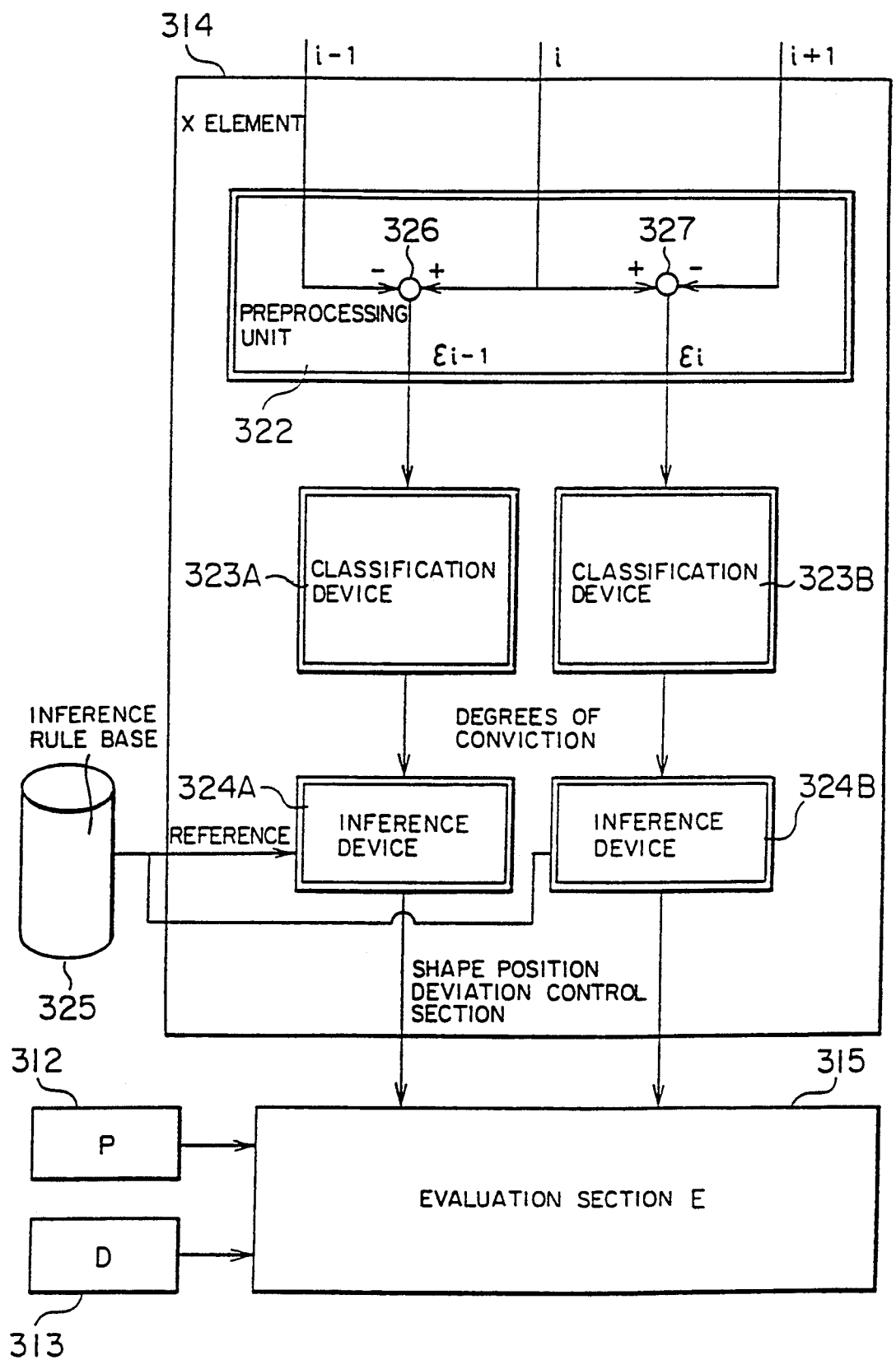
Figure 28:
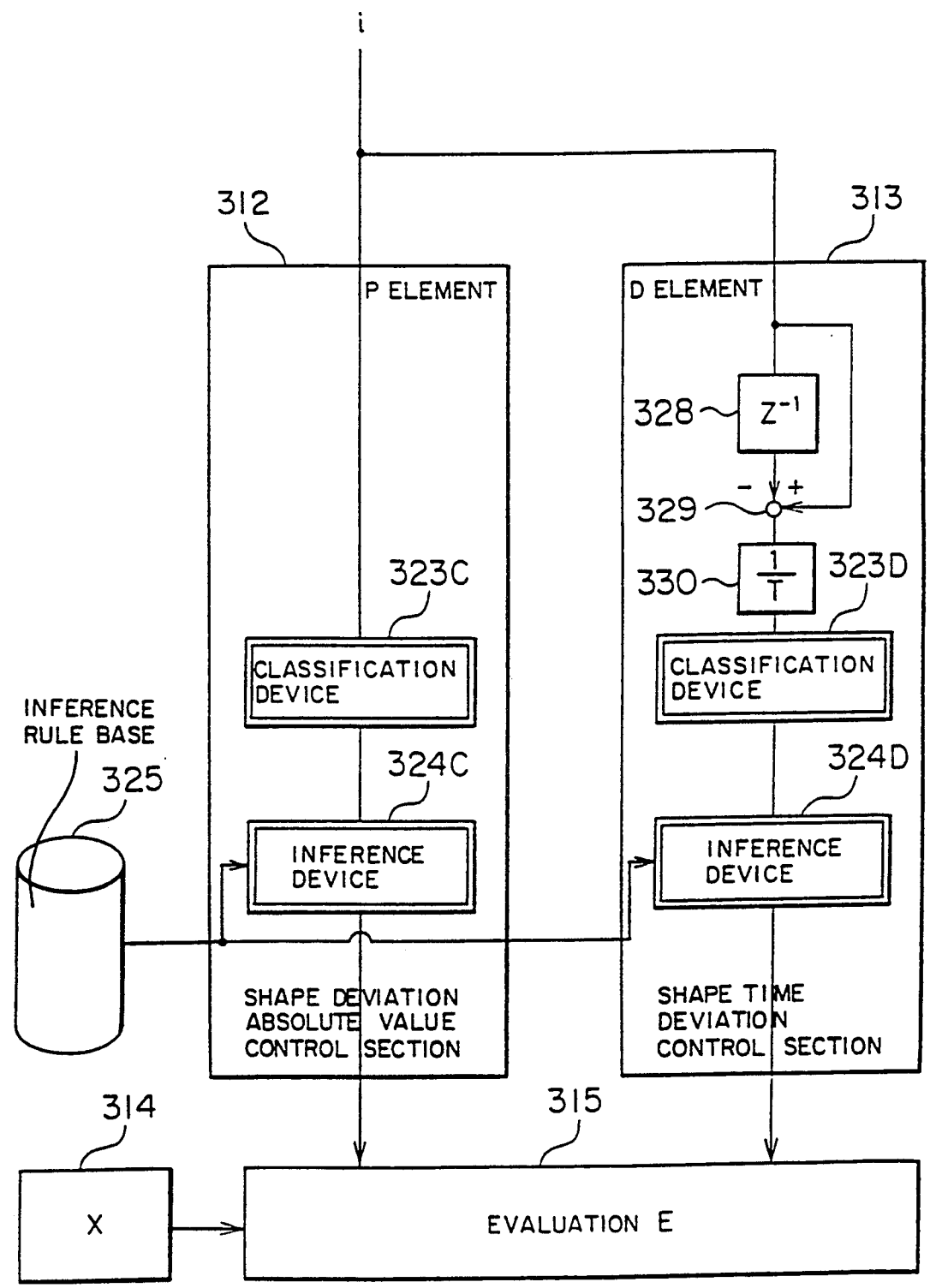
Figure 29:
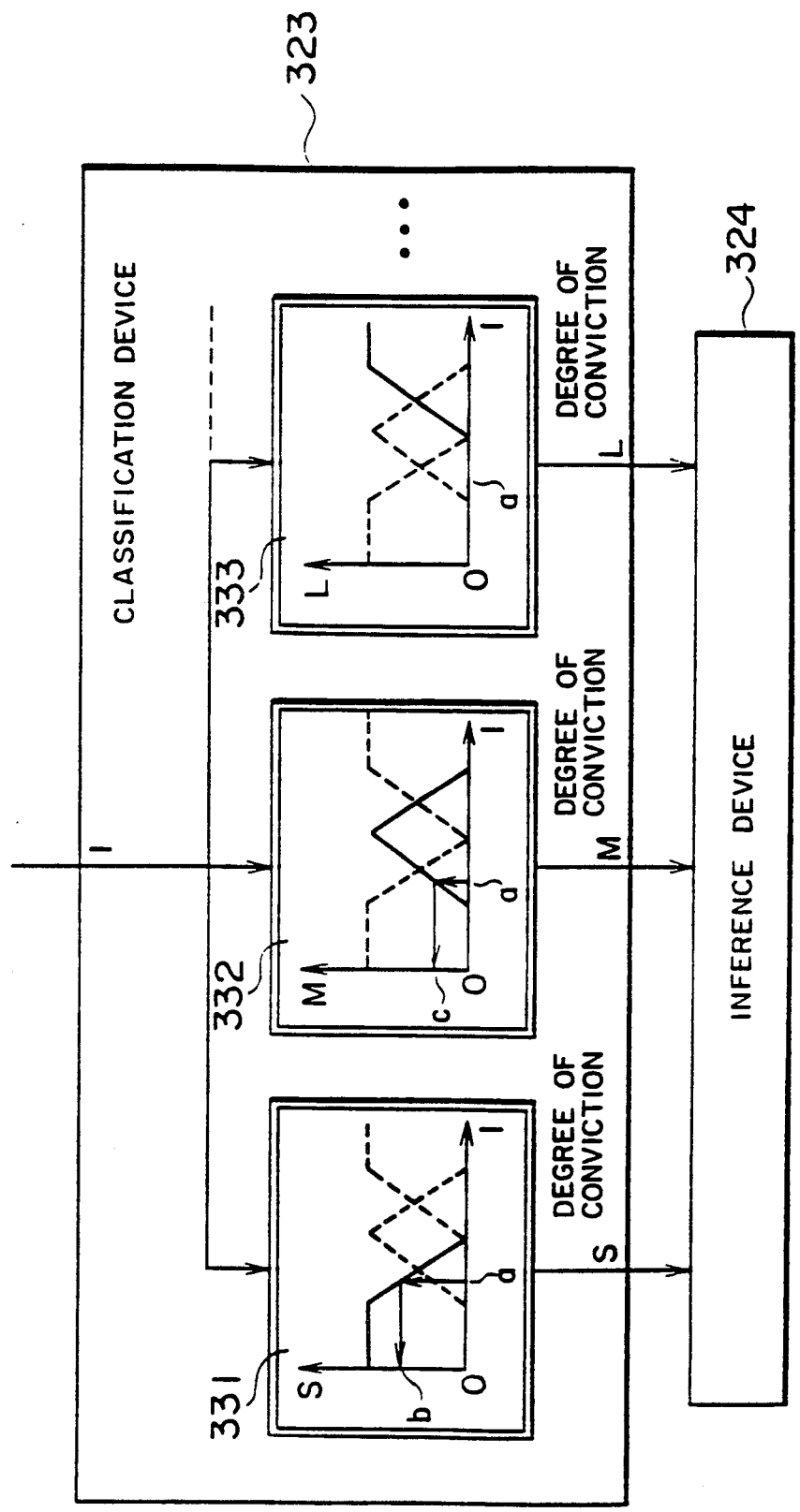
Figure 30:
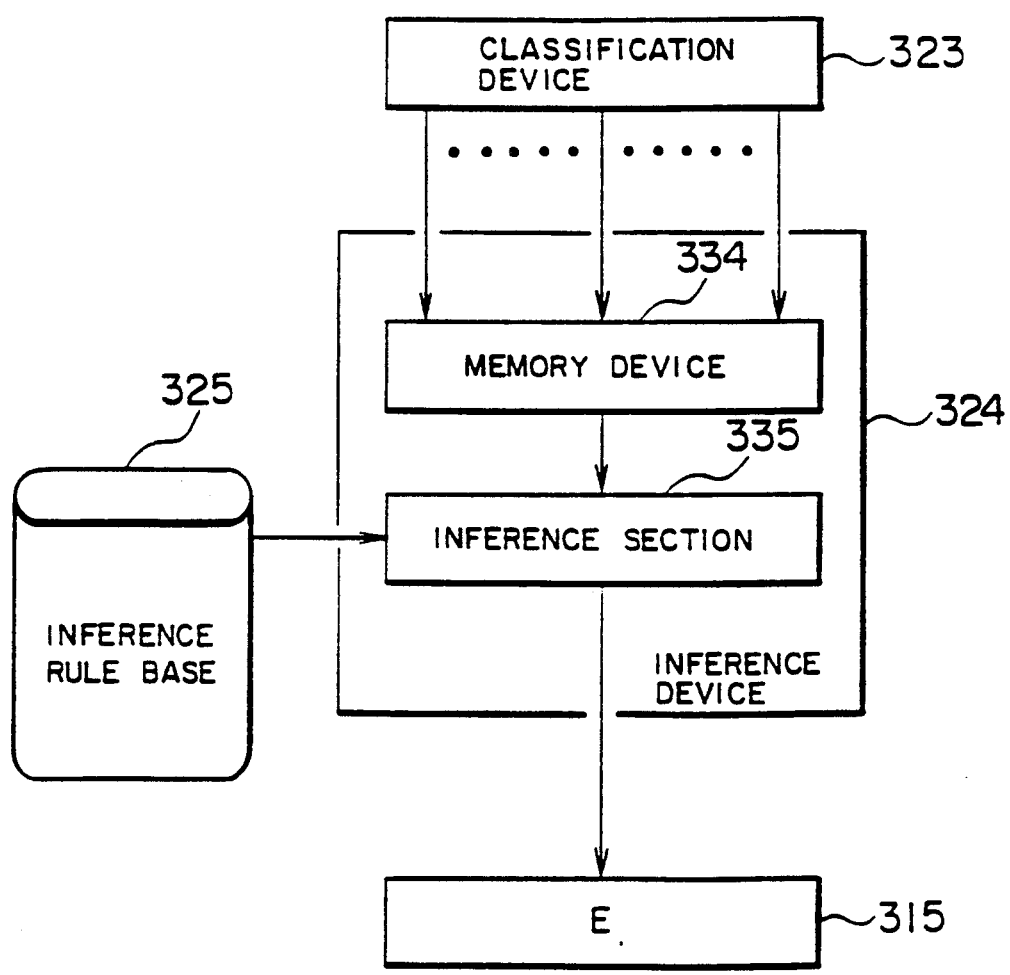
Figure 31:
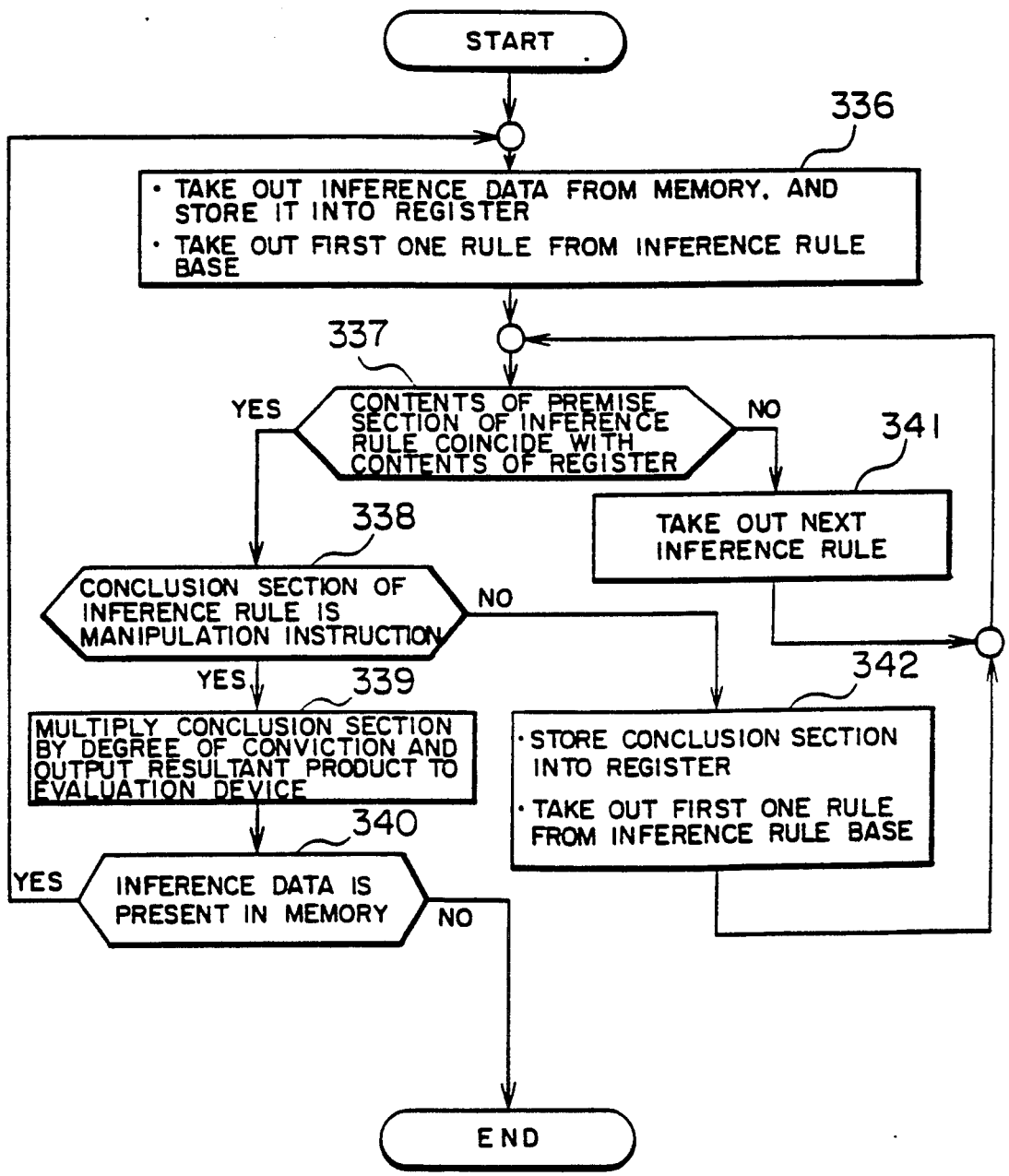
Figure 32:
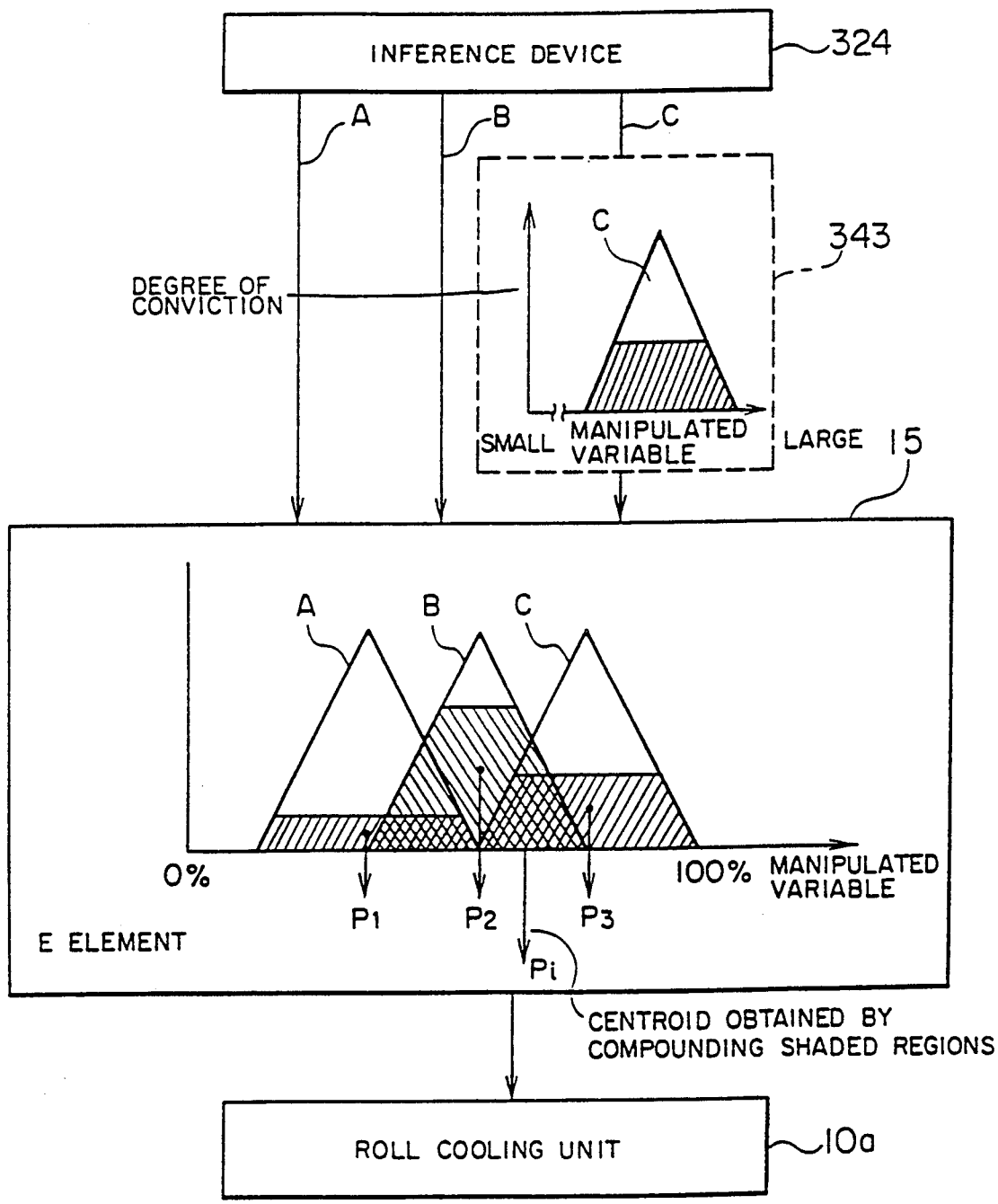
Figure 34A:
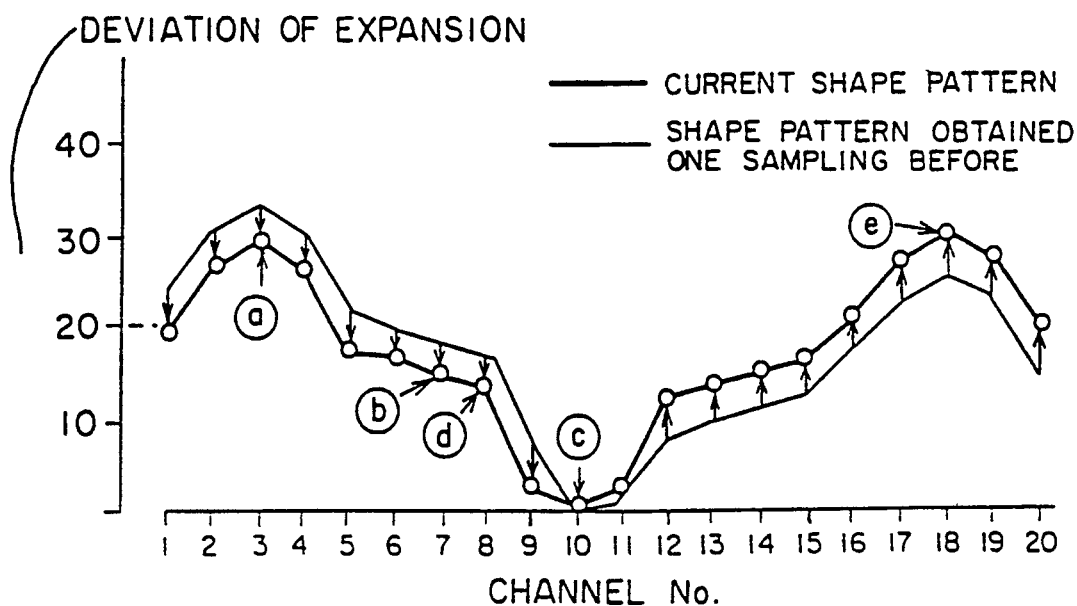
Figure 34B:
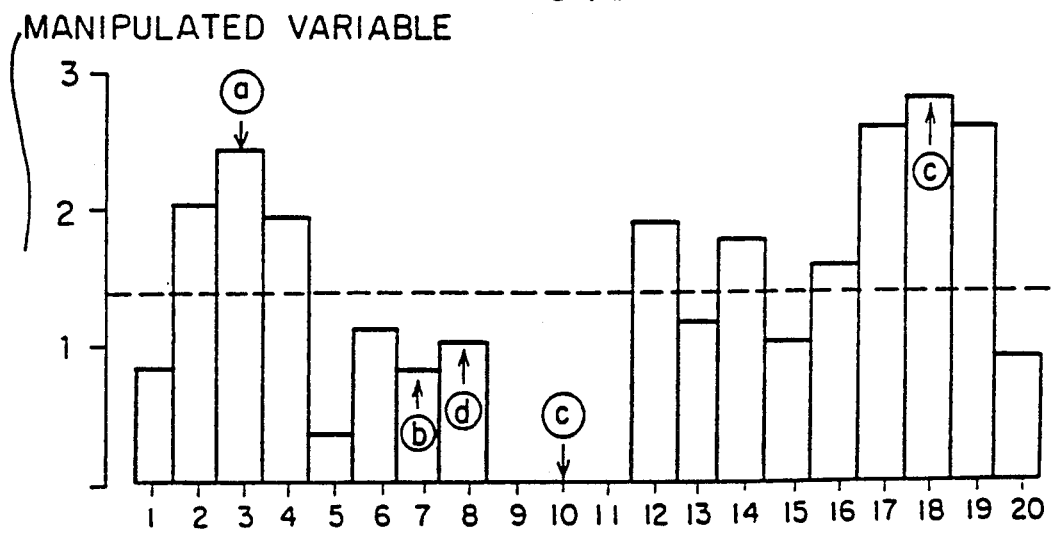
Figure 34C:
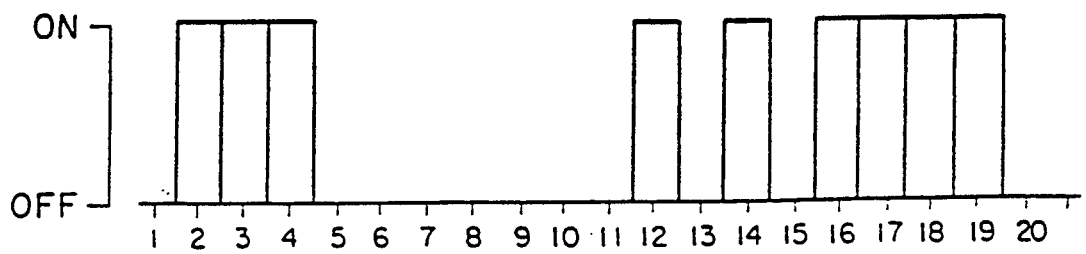
Figure 35A:
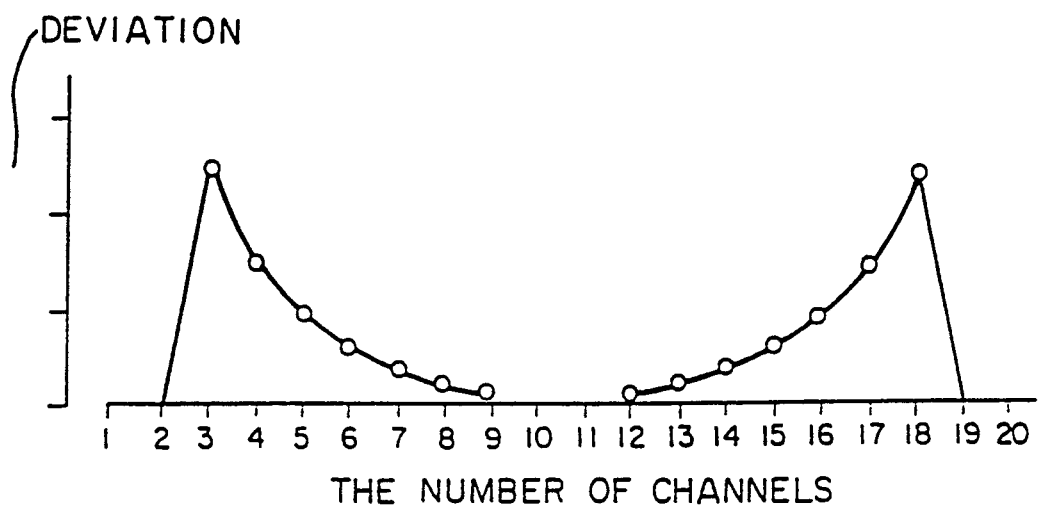
Figure 35B:
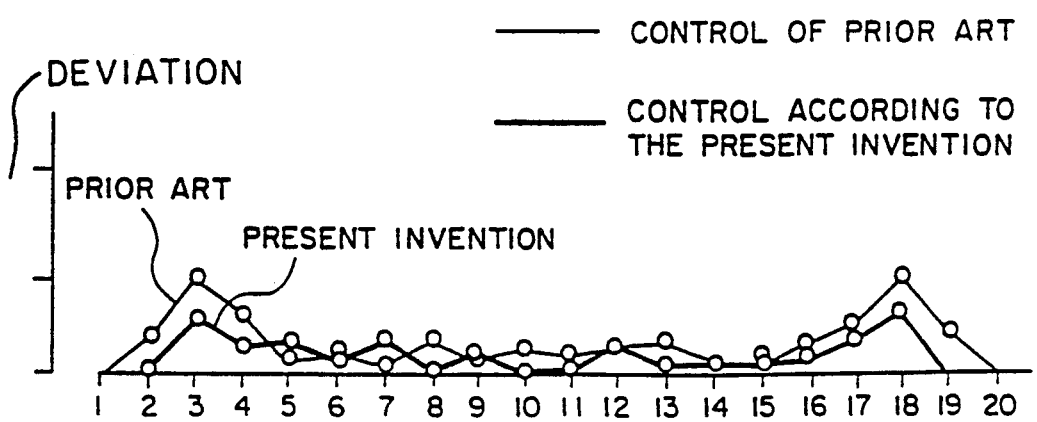

FIG, 14 is a block diagram showing the configuration of a memory device;

FIG. 15 is a block diagram showing the configuration of a pattern recognition device;

FIG. 16 is a block diagram showing the configuration of a learning device having a simulator;

FIG. 17 is a diagram showing the configuration of a pattern recognition device;

FIG. 18 is a diagram showing an example of an input pattern;

FIG. 19 is a diagram showing the relationship between the output of the pattern recognition device and the command generation device;

FIGS. 20 and 21 are diagrams showing the change of a rolled materials with time;

FIG. 22 is a diagram for exemplifying a production rule and a fuzzy rule;

FIG. 23 is a diagram illustrating a method for converting the degree of similarity into the manipulated variable;

FIG. 24 is a diagram illustrating the processing of an input waveform;

FIG. 25 is a block diagram showing another embodiment of the present invention;

FIG. 26 is a diagram showing the configuration of a coolant system;

FIG. 27 is a diagram showing the configuration of a shape position deviation control section;

FIG. 28 is a diagram showing the configuration of a shape deviation absolute value control section and the shape time deviation control section;

FIG. 29 is a diagram showing the configuration of a classification device section;

FIG. 30 is a block diagram showing the configuration of an inference device section;

FIG. 31 is a flow chart of operation of the inference device;

FIG. 32 is a diagram illustrating an evaluation method;

FIG. 33 is a diagram showing an example of inference;

FIGS. 34A, 34B and 34C are diagrams showing relations of the manipulated variable and manipulation signal with respect to an input shape pattern;

FIGS. 35A and 35B are diagrams showing an output shape pattern resulted from control applied to a specific input shape pattern in accordance with the present invention as compared with that in accordance with the prior art.

DESCRIPTION OF THE PREFERRED EMBODIMENTS

An embodiment of a control system according to the present invention will now be described by referring to FIG, 1.

A controlled system 1 comprises a plurality of actuators. The actuators are controlled by an actuator control unit G6 which generates a control execution command for each actuator. Operation of the above described controlled system 1 and plurality of actuators is detected by a detection unit G14 comprising various detectors disposed in the control system 1 and actuators. Output signals of a plurality of detectors of the detection unit G14 are inputted to an optimality decision unit G13. The optimality decision unit 13 comprises an input section for recognizing the above described plurality of inputted detector output signals as a pattern, a memory device for storing the inputted pattern, a processing section for collating the inputted pattern with a plurality of previously stored patterns and for outputting degrees of similarity with respect to the previously stored patterns, and a command generation device 12 for determining the manipulated variable of each actuator on the basis of the above described degree of similarity, for generating a command signal, and for transmitting the command signal to the actuator control unit G6. A function can be added so that in storing patterns into the pattern memory device the operator may define an optimum output with respect to one pattern input on the basis of experience, set the optimum output, and activate the above described optimality decision device, and outputting of the best manipulated variable may be recognized. Further, the optimality decision unit G13 is so configured that a teaching unit G16 for changing beforehand the above described contents of pattern memory in case of change of the controlled system 1 or the actuator may be added thereto.

On the other hand, the prior art system does not comprise the optimality decision unit G13. In general, the output signal of the detection unit G14 is transmitted to the actuator control unit G6 to apply optimization control to respective individual actuators in the prior art system. In the prior art system, therefore, optimality of the overall system is not attained. By adding the optimality decision unit G13 for judging the optimality of the overall system in accordance with the present invention, however, the optimality of the overall system can be judged. In addition, even if one of the actuators becomes defective, the function of the defective actuator is covered by another actuator owing to the optimality decision device. Further, a change of actuator and a change of the controlled system can also be accommodated flexibly.

A control system of the present invention will now be described in detail by referring to an example in which the control system is applied to rolling mill control.

Figure 2:
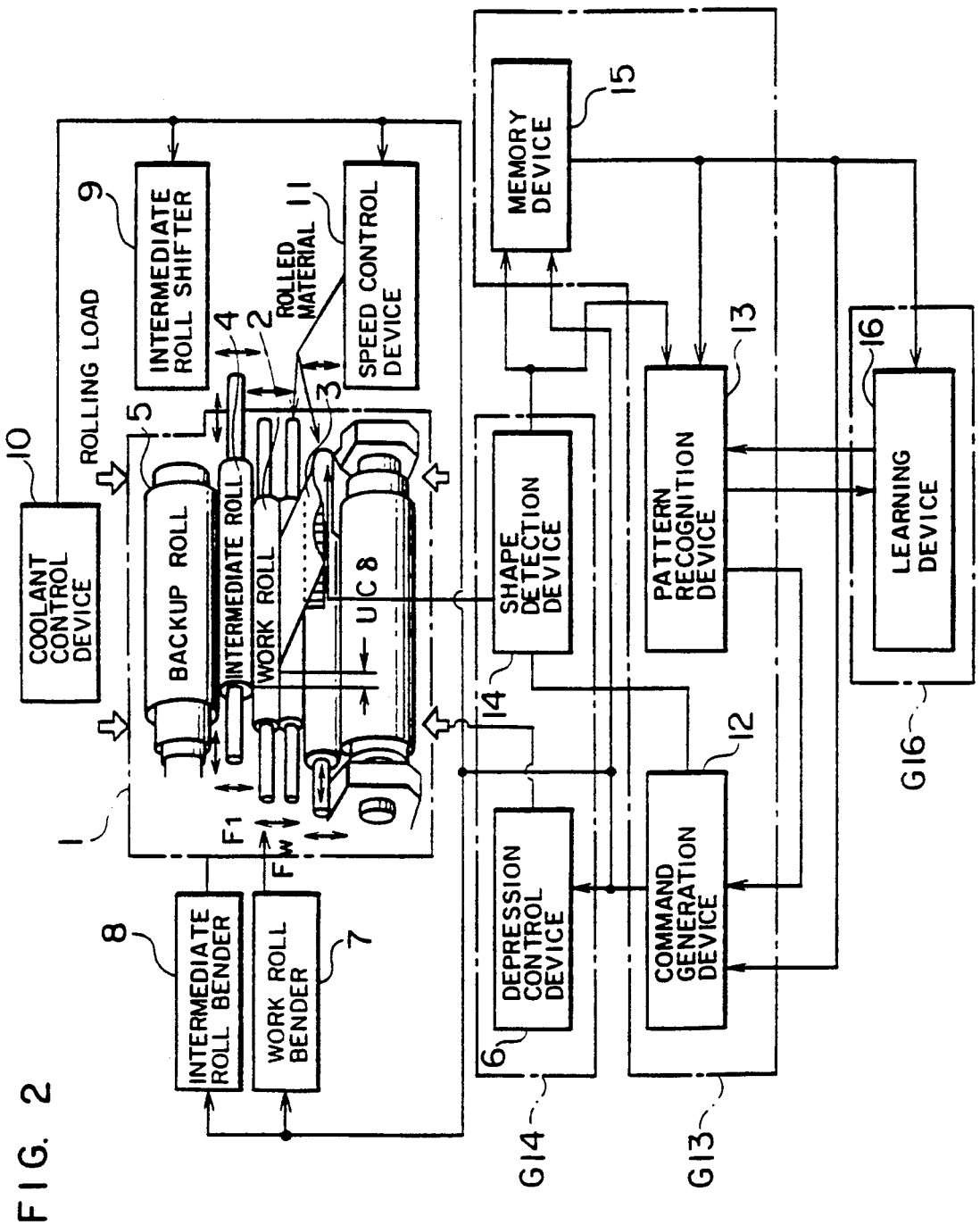
FIG. 2 is a diagram showing the configuration of an embodiment of a rolling mill control system according to the present invention.

An embodiment of a rolling mill control system according to the present invention will hereafter be described by referring to FIG. 2.

In a rolling stand 1 to be controlled, a rolled material 3 put between a pair of work rolls 2 opposed each other is so made thin by rolling force exerted between the work rolls 2 and tension exerted upon the rolled material 3 as to have a desired plate thickness. Intermediate rolls 4 are so disposed that the work rolls 2 may be put between them. Backup rolls 5 are so disposed that the intermediate rolls 4 may be put between them. Rolling force is applied to the above described backup rolls 5 by a depression control device 6 using force such as oil pressure. Its rolling force is transmitted to intermediate rolls 4 via contact force between the backup rolls 5 and the intermediate rolls 4. The rolling force thus transmitted to the intermediate rolls 4 is transmitted to the rolled material 3 via contact faces between the intermediate rolls 4 and the work rolls 2 and contact faces between the work rolls 2 and the rolled material 3. Plastic deformation is caused in the rolled material 3 by the rolling force, resulting in desired plate thickness.

Since the roll width of the rolls 2, 4 and 5 is wider than the plate width of the rolled material 3 and rolling force is applied, the rolls are deformed. For example, portions of the work rolls 2, which are off the plate width of the rolled material, are bent by the rolling force.

Therefore, ends of the rolled material 3 become thinner than the central portion, resulting in a convex sectional shape. Work roll bending force Fw is applied to shafts of the work rolls 2 in such a direction as to widen the gap by a work roll bender 7 in order to prevent ends of the rolled material 3 from becoming thin. In the same way, intermediate roll bending force $F_1$ is applied to shafts of intermediate rolls 4 by an intermediate roll bender 8.

Further, an intermediate roll shifter 9 moves the intermediate rolls 4 in the plate width direction. By making forces applied to both sides of the rolls 2, 4 and 5 as well as the rolled material 3 asymmetric with respect to the center line of the rolled material in the rolling direction by means of the above described movement, the shape of plate thickness distribution in the widthwise direction of the rolled material is controlled.

On the other hand, energy applied to the rolling mill for effecting rolling is used for plastic deformation of the rolled material 3 and also produces sound, vibration and heat. Energy thus changed to heat is radiated via the rolled material 3 and raises the temperature of the work rolls 2. Because of this temperature rise, the work rolls expand and change in diameter. In general, however, the roll diameter deforms nonuniformly. In order to effect control so that the roll diameter may become uniform, therefore, a plurality of nozzles (not illustrated) are disposed in the plate width direction and a coolant control device 10 for applying coolant to the work rolls 2 via nozzles.

A speed control device 11 comprising a motor for moving the rolled material 3 is connected to the shaft of the above described work roll 2.

A control unit for the rolling mill comprises a command generation device 12 for generating operation commands and transmitting them to actuators such as the above described depression control device 6, work roll bender 7, intermediate roll bender 8, intermediate roll shifter 9, coolant control device 10 and speed control device 11, pattern recognition device 13 for judging to what degree the shape of the rolled material 3 resembles each of the plurality of patterns stored beforehand and for outputting the degree of certainty, i.e., the degree of similarity or the degree of conviction with respect to each pattern to the above described command generation device 12, shape detection device 14 for detecting the shape of plate thickness of the rolled material 3 and for outputting it to the pattern recognition device 13, memory device 15 for storing outputs of the above described shape detection device 14 and command generation device 12, and learning device 16 for changing parameters of the pattern recognition device 13 in accordance with learning by using information of the storage device 15.

Figure 3:
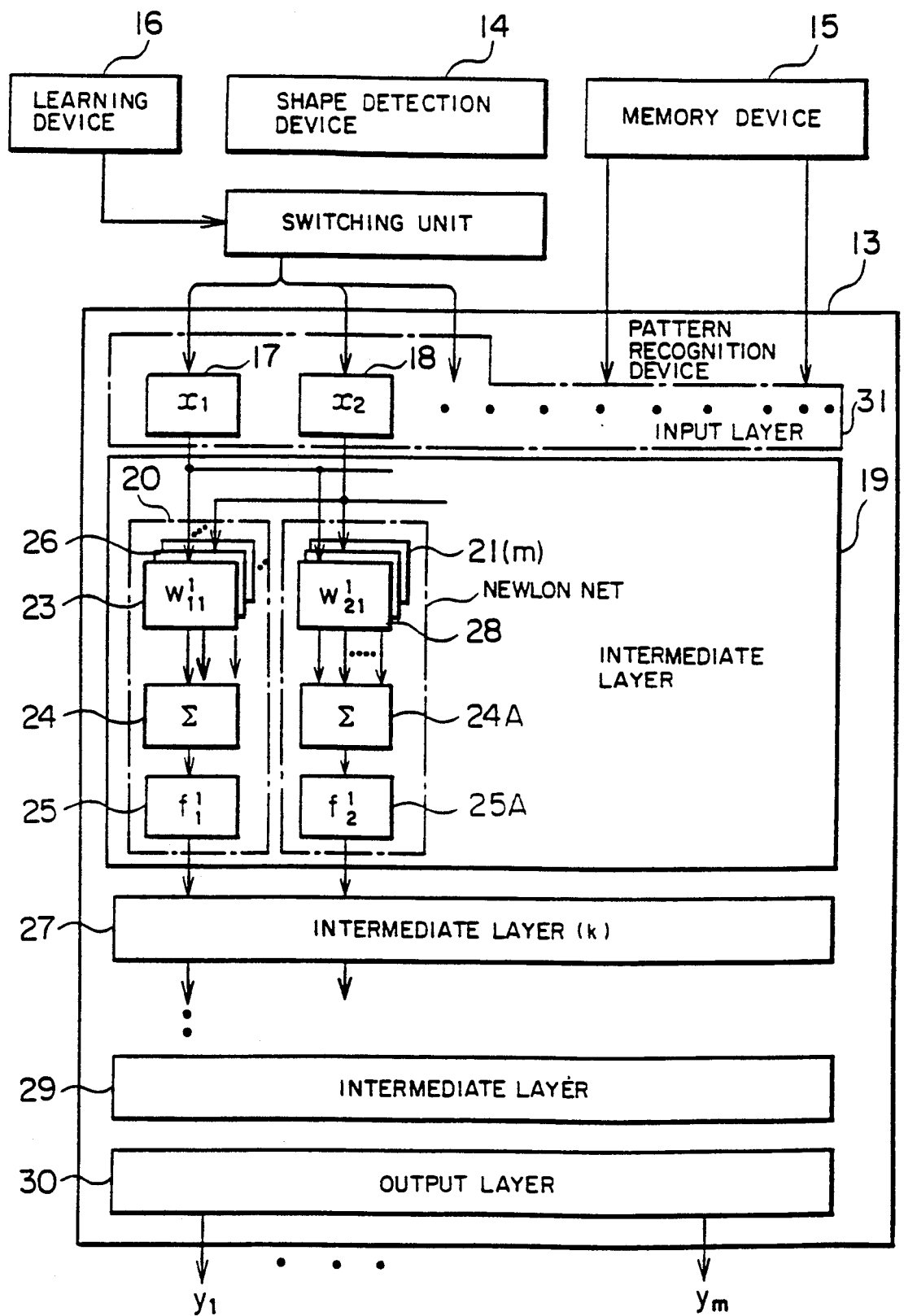
FIG. 3 is a block diagram showing the configuration of a pattern recognition device.

FIG. 3 shows a circuit obtained when the above described shape pattern recognition device 13 is constituted by a neurocomputer. This circuit judges to what degree the shape of plate thickness detected by the shape detection device 14 resembles each of predetermined various reference patterns and derives the degree of certainty, i.e., the degree of conviction with respect to each reference pattern.

First of all, a plurality of reference patterns are stored beforehand in the learning device 16 as to represent different reference shapes inputted to an input layer 31. Weighting functions $W_{11}$, $W_{21}$, ....... of a plurality of intermediate layers 19, 27 ....... 29 are so defined that the reference patterns inputted to the input layer 31 may be processed in the plurality of intermediate layers 19, 27 ....... 29 and data of predetermined values may be outputted from an output layer 30. Weighting functions will be described later. In case m reference patterns are provided, for example, the output of the output layer is given in the form of m bits comprising $Y_1$, $Y_2$, ....... $Y_m$. Each bit represents the degree of conviction of the input pattern with respect to each reference pattern. For example, the degree of conviction with respect to the first pattern is represented by $Y_1$. When the input pattern coincides with the first reference pattern, i.e., when the first reference pattern is inputted to the input layer, weighting functions of respective intermediate layers are so defined that outputs of the output layer may satisfy the following relations.

$Y_1 = 1$, $Y_2 = Y_3 = ..... = Y_m = 0$

A method for determining the weighting functions will be described later. When a second reference pattern is inputted to the input layer, the weighting functions of respective intermediate layers are so determined that $Y_2 = 1$ and all of other bits may become 0. For determining the weighting functions of respective intermediate layers so that data of respective predetermined values may be outputted for all of the reference patterns, a relatively large amount of repetitive calculations are needed in case a conventional computer is used. By using a neurocomputer and by providing as many intermediate layers as a number corresponding to the number of reference patterns as shown in FIG. 3, however, desired weighting functions can be determined relatively easily. After the weighting functions has thus been determined, signals representing the actual shape of plate thickness are inputted to the input layer. On the basis of values of the output bits $Y_1$, $Y_2$, ....... $Y_m$ of the output layer at that time, the degree of conviction of the input pattern with respect to each reference pattern can be derived.

Operation of the circuit shown in FIG. 3 will now be described. Outputs of the shape detection device 14 and the memory device 15 storing the output of the shape detection device and having time series information of shape pattern are inputted to input cells 17 and 18 of the above described pattern recognition device 13. The signal inputted to the input cell 17 is so converted by a function value as to be convenient to subsequent arithmetic processing and then inputted to the intermediate layer 19. The output of the input cell 17 thus inputted to the intermediate layer 19 is inputted to cells 20 and 21 of the intermediate layer 19. The output signal of the input cell 17, which is inputted to the cell 20, is increased by $W^1_{11}$ times by a weighting function 23 and then inputted to an adder 24. The output of the input cell 18 is increased by $W^1_{12}$ by a weighting function 26 and then inputted to the adder 24. In the adder 24, the output of the above described weighting functions 23 and 26 are added together, and the sum represented as $$Z = \Sigma W 1_{ij} = W 1_{11} \times 1 + W 1_{12} \times 2 + \ldots W_1$$

is derived.

Output $Z_1$ of the adder 24 is inputted to a function device 25 to undergo linear or nonlinear function operation such as $$f(Z) = \frac{1}{1 + e^{-z}}$$

therein. The result is outputted to the succeeding intermediate layer 27. The cell 20 comprises the above described weighting functions 23 and 26, adder 24 and function device 25.

In the same way, outputs of the input cells 17 and 18 are inputted to the cell 21. The output of the input cell 17 is increased by $W^1{}_{12}$ times in a weighting function 28 and then outputted to the intermediate layer 27 of the next stage via an adder 24A and a function device 25A.

The intermediate layer 27 has the same structure as that of the intermediate layer 19, and outputs of the intermediate layer 19 are used instead of the outputs of the input cells 17 and 18.

Assuming now that the weight of the weighting functions 23, 26 and 28 is $W^k{}_{ij}$, $W^k{}_{ij}$ represents a weight whereby the j-th output of the (k−1)-th intermediate layer (input cell if k=1) is multiplied in the i-th cell of the k-th intermediate layer.

As heretofore described, the signal inputted to the pattern recognition device 13 is outputted via the input cells 17 and 18, a plurality of intermediate layers 19, 27 and 29, and an output layer having a form obtained by removing the weighting function and the adder from the cell of an intermediate layer.

This pattern recognition device 13 has a feature that only simple product sum calculation is required and repetitive calculation such as feedback is not required. Further, when each product sum term of an intermediate layer is implemented by using hardware, parallel processing is possible. As a result, high speed calculation is possible.

By storing beforehand command values for respective actuators in response to each output pattern at a stage in this pattern recognition device succeeding the output layer 30, command values which are the closest to the output pattern may be directly given to actuators. This scheme has good responsiveness. As compared with a scheme which will be described later, however, precision of control becomes slightly worse.

Figure 4:
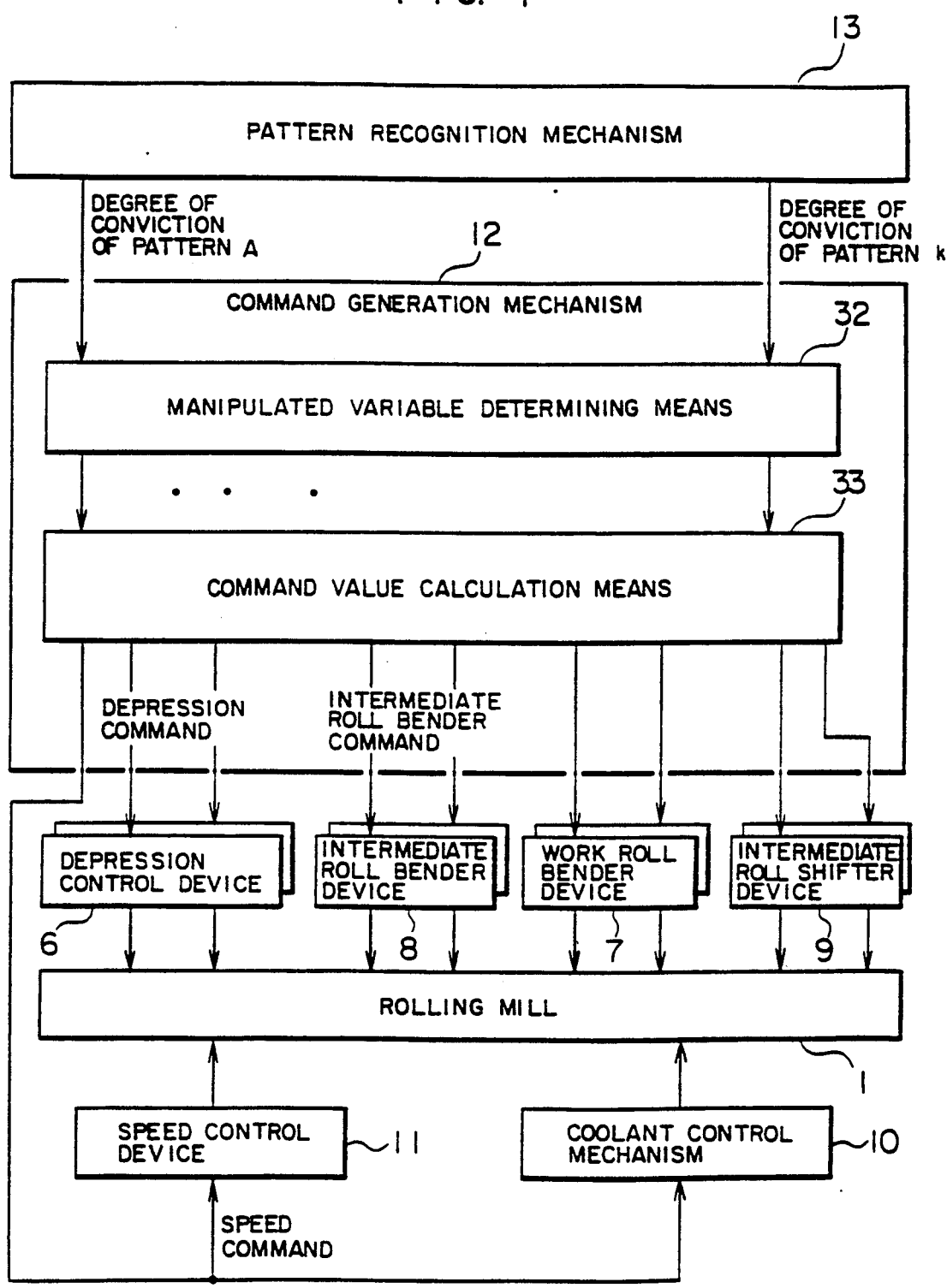
FIG. 4 is a block diagram showing the configuration of a command generating device.

The result of processing performed in the pattern recognition device 13 is supplied to a rolling mill 1 via a processing device shown in FIG. 4. That is to say, the output of the pattern recognition device 13 is inputted to manipulated variable determining means 32 disposed in the command generation device 12. In the manipulated variable determining means 32, a processing device which is the most effective to input signal processing is selected out of a plurality of processing devices prepared within the manipulated variable determining means 32. The processing device thus selected executes processing and outputs the manipulated variable. By using the result of processing performed in the above described manipulated variable determining means, command value calculation means generates specific command values of respective actuators such as a depression command for the depression control device 6 and an intermediate roll bender command for the intermediate roll bender 8. Alternatively, it is also possible to directly input the output of the shape detection device 14 without passing it through the pattern recognition device 13 and process it in the above described optimum processing device among a plurality of processing devices prepared inside. In this case, however, the knowledge base must be enriched in order to sufficiently reflect the manipulation method of an expert operator when using various inference devices.

Figure 5:
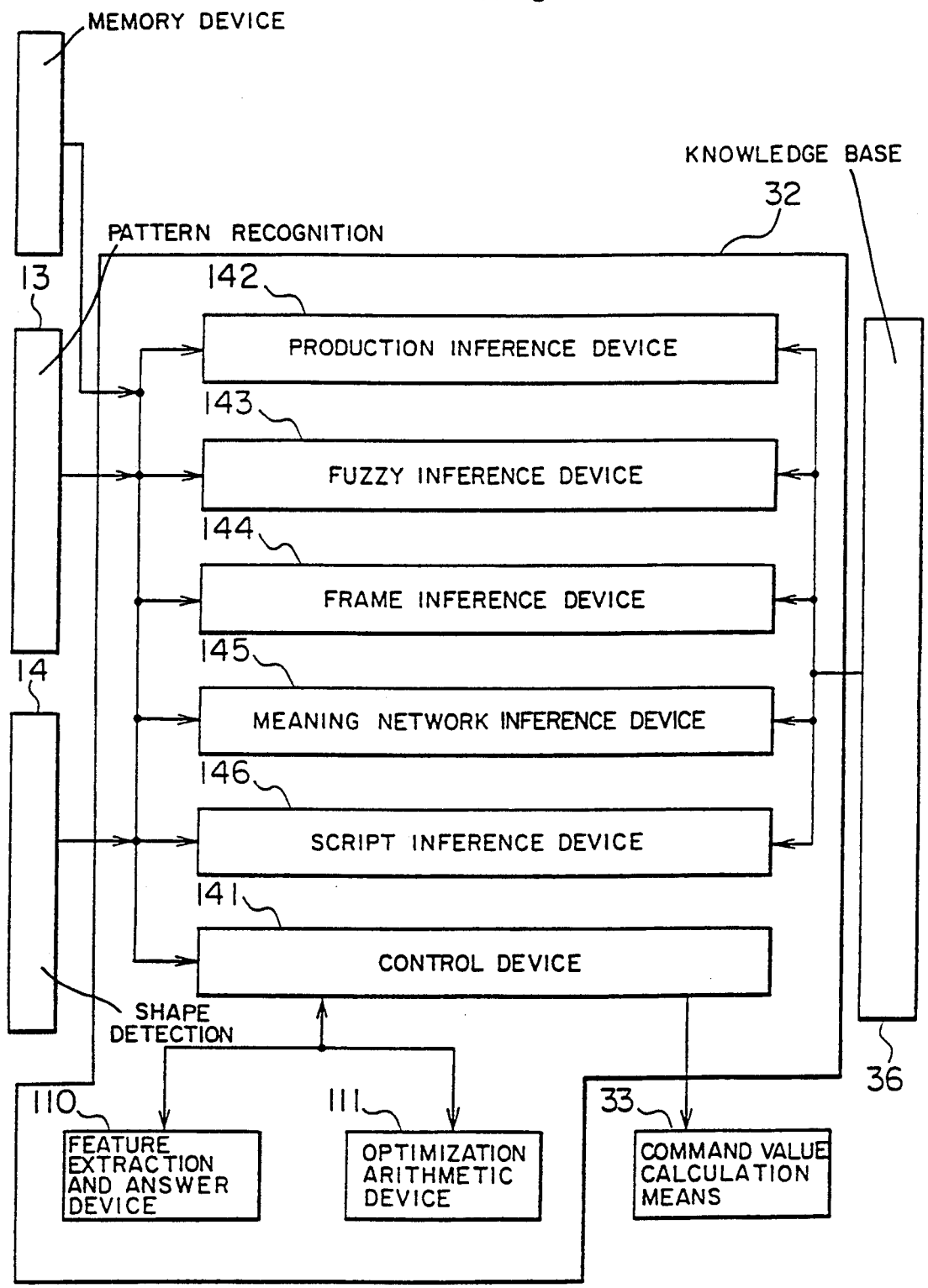
FIG. 5 is a block diagram showing the configuration of manipulated variable determining means.

FIG. 5 shows the configuration of the above described manipulated variable determining means 32. The manipulated variable determining means 32 receives signals fed from the shape detection device 14 and the pattern recognition device 13 and starts control device 141. The control device 141 determines inference to be used by using knowledge base on the basis of the kind of the problem. That is to say, the control device 141 starts a production inference device 142 in case conclusion must be derived syllogistically. In case there is a vague factor, the control device 141 starts a fuzzy inference device 143. For a problem having a frame of some degree, a frame inference device 144 is started. For a problem having causal relations and relations such as device configuration which are similar to networks, a meaning network inference device 145 is started. For such a problem that the object of diagnosis operates in time sequence, a script inference device 146 is started. For an experiential problem which cannot be solved by the above described various inference devices, the control device 141 starts an optimization arithmetic device 111 for deriving the optimum solution at high speed, and the control device 141 also starts a feature extraction and answer device 110 (comprising a neurocomputer of Rumelhart type) for performing pattern like storage, extracting a feature and solving a problem needing an answer. The result of processing performed in the manipulated variable determing means is outputted to the command value calculation device via the control device 141. Since individual inference devices are known, description will be omitted with the exception of devices directly relating to the present invention.

Figure 6:
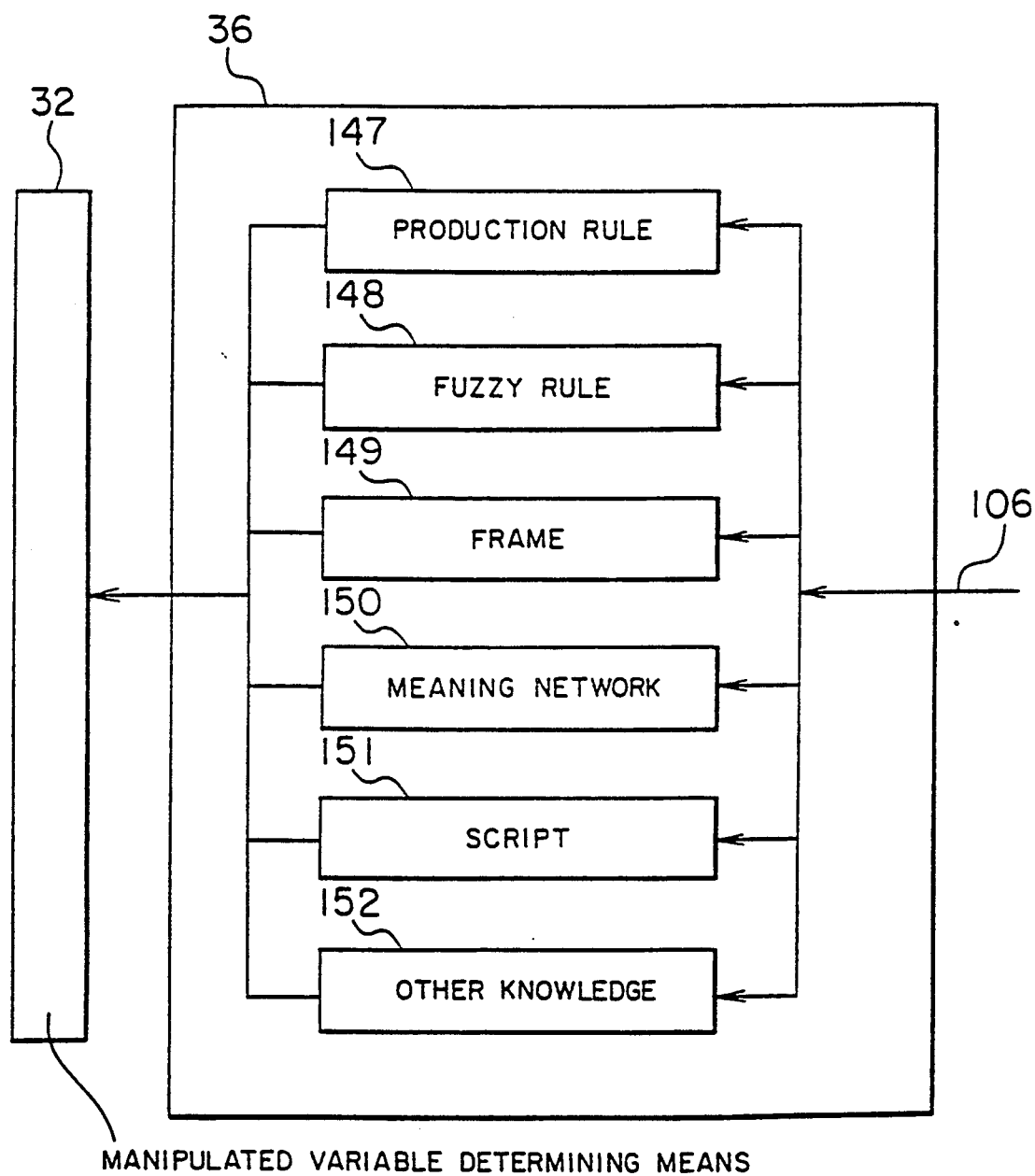
FIG. 6 is a block diagram showing the configuration of a knowledge base.

FIG. 6 shows the configuration of the knowledge base 36. In the above described knowledge base, knowledge 106 based upon the experience or the like of an expert of control and inputted from the outside is classified into a production rule 147 for executing inference syllogistically, a fuzzy rule 148 comprising knowledge for performing an inference on the basis of vague information, a frame 149 comprising knowledge which can be described by using a frame such as a parts configuration of an object to be diagnosed, a meaning network 150 comprising relations between parts and relations of common sense collected and put in order in the network form, a script 151 which, in case the object to be diagnosed advances it works in order, puts those works in order and stores them, and other knowledge 152 which cannot be described by the above described knowledge 147 to 151. The knowledge classes thus classified are respectively stored.

Figure 7:
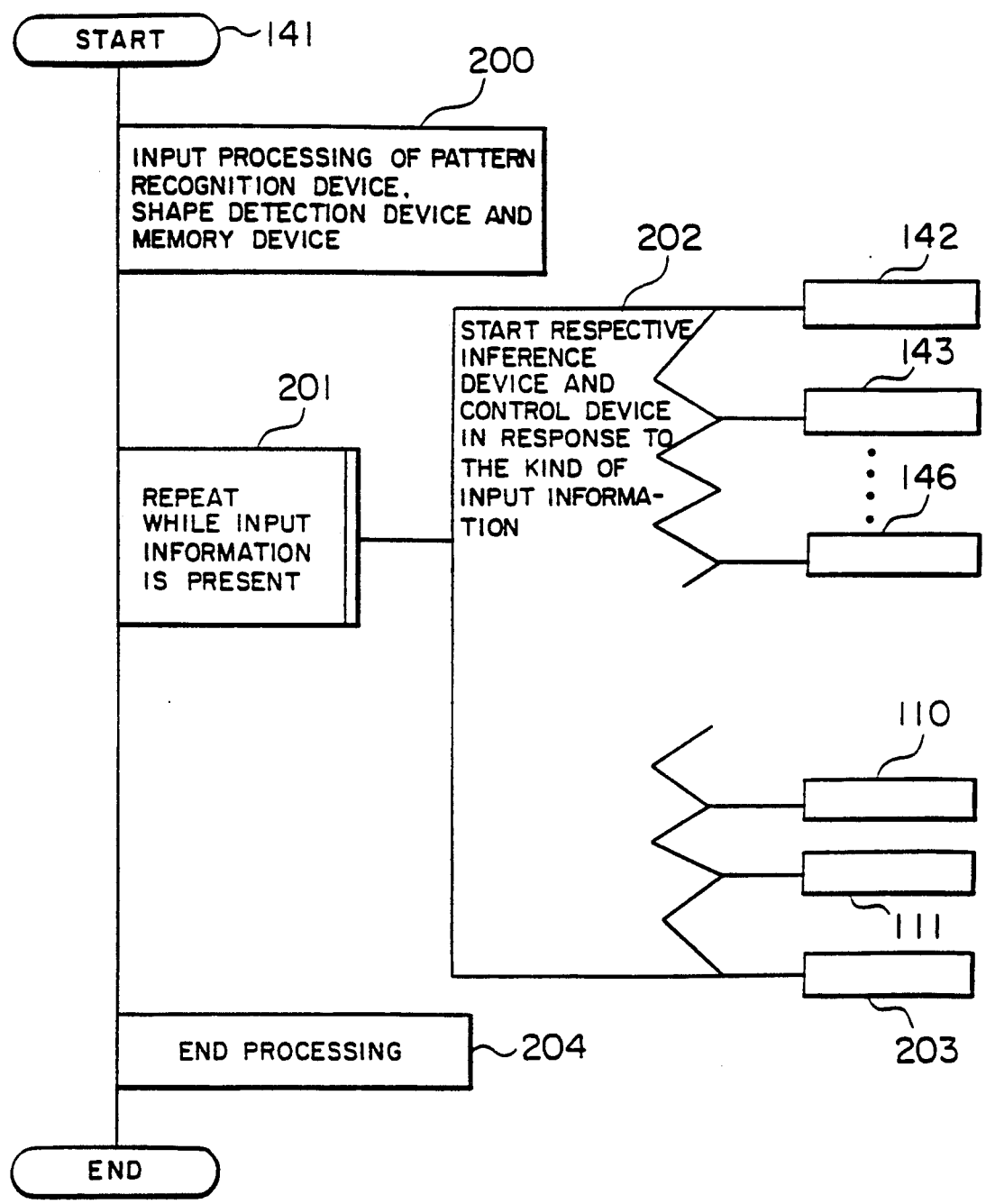
FIG. 7 is a flow chart of operation of the manipulated variable determining means.

FIG. 7 is a diagram for illustrating the operation of the manipulated variable determining means 32. The processing performed by the control device 141 comprises processing step 200 for putting information supplied from the pattern recognition device 13, the shape detection device 14 and the memory device 15 in order and for converting such information into data usable for succeeding processing, repetitive processing step 201 for taking out data prepared at the above described step 200 until there remain no data and for transferring the data thus taken out to step 202, judgment step 202 for determining the inference device and processing to be started on the basis of information collected at the step 201, various inference devices 142 to 146, the feature extraction and answer device 110, the optimization arithmetic device 111, a general control device 203 for executing algorithms of classical control such as PID control and modern control such as multivariable control, and end processing step 204 for executing flag resetting needed to finish the above described steps.

Roles of respective processing devices will now be described. The production device 142 is suitable to such control that the expert operator construct logical relations by using fragmentary production rules. The fuzzy inference 143 is suitable to quantifying value knowledge of the operator which cannot be quantified, whereby the operator slightly moves an actuator if the marked state of the control object changes, for example, so as to allow processing in a computer and to then determining the manipulated variable.

In case the marked state of the control object has changed and then the original state is restored by using a knowledge called frame which describes a relationship between control units, the frame inference device 144 is suitable to determine the processed variable to be manipulated for each related device on the basis of the relationship between those units.

The meaning network inference device 145 puts the above described frames which is fragmentary knowledge in order and systematizes them to construct a network. Therefore, it is possible to derive influence of manipulation of a particular actuator. The meaning network inference device 145 is thus suitable to construct a compensation system.

The script inference device 146 infers on the basis of procedural knowledge obtained when a particular state has occurred. Therefore, the script inference device 146 is suitable to control like sequence control such as control as the time of detect needing disposal with predetermined procedure.

If the feature extraction and answer device 110 beforehand learns the relation between the input patterns of the above described pattern recognition device 13, shape detection device 14 and memory device 15 and output obtained from the above described inference devices 142 to 146 when the above described input patterns are inputted thereto, the feature extraction and answer device 110 is capable of outputting identical results at high speed unlike the case where the inference devices 142 to 146 perform inference and determine outputs. This is a feature of the feature extraction and answer device 110. Since the controlled system 1 is typically highly nonlinear, operation must be reset if the operation point changes by some cause. In that case, calculation in the optimization arithmetic device 111 is performed by using an algorithm such as the steepest descent method, dynamic programming, linear programming, mountain climbing method, conjugate slope method or neurocomputer of the Hopfield type. The optimization arithmetic device 111 supplies the optimum response even to a nonlinear control object.

Figure 8:
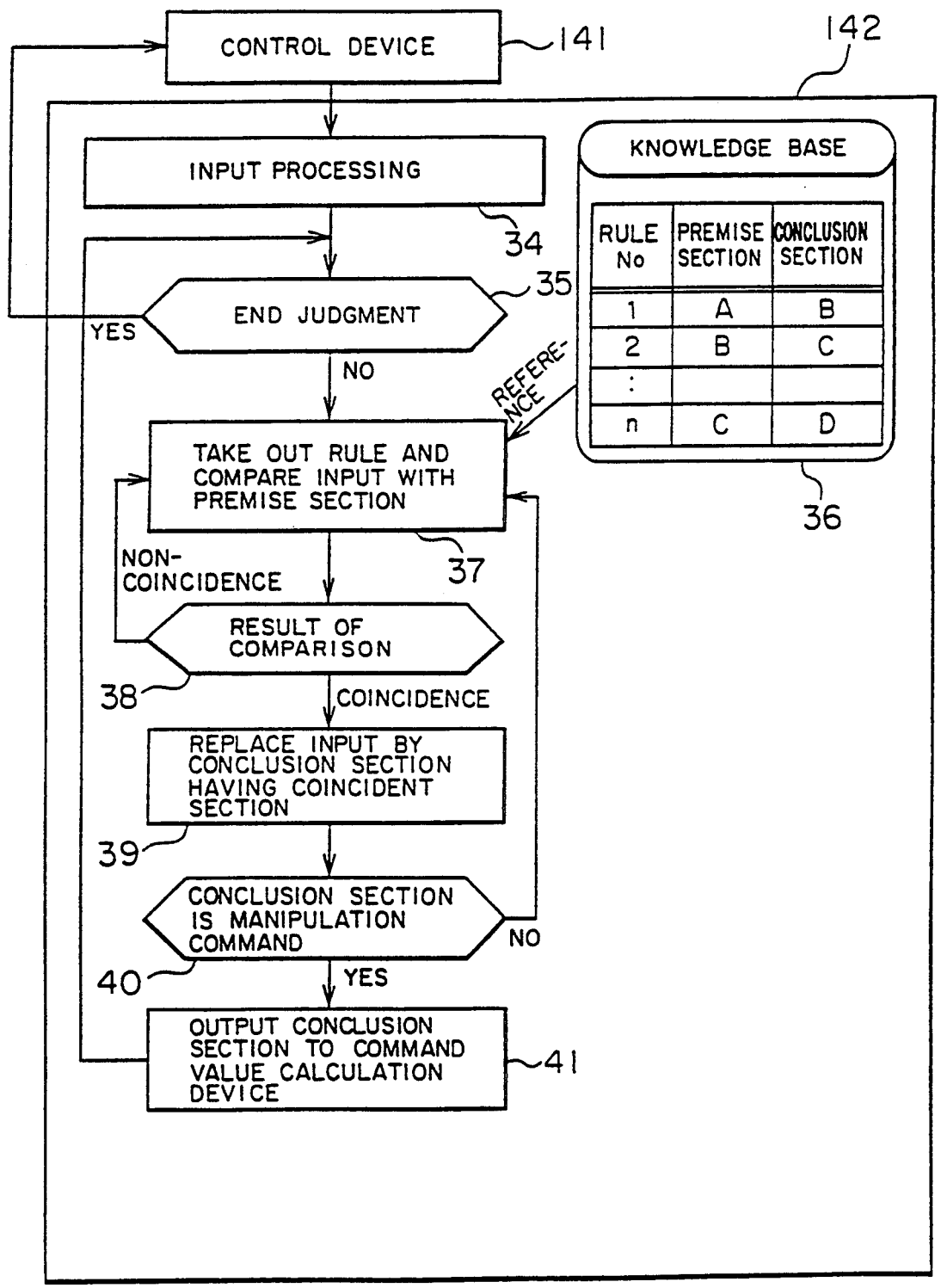
FIG. 8 is a flow chart of operation of a production device.

FIG. 8 is a diagram for illustrating the operation of the production device. The production inference device 142 started by the control device 141 executes input processing 34, which is stored to its internal memory when the production inference device 142 is started by the control device 141. The production inference device 142 then executes end judgment device 35, whereby information pieces stored in the above described input processing 34 are taken out one by one, and the processing of the production inference device 142 is finished when pattern information is not present in the memory. By using the kind of the pattern extracted in the above described end judgment device 35 and the degree of conviction thereof, rules are taken out from the knowledge base 36 one by one. At processing step 37, the kind of the pattern of that input is compared with a premise section of the rule. If the result of comparison is coincidence at step 38, the next processing step 39 is executed. In case of noncoincidence, the step 37 is executed. In case of coincidence, the above described input is replaced by the conclusion section of the above described rule. As the handling of the degree of conviction at this time, it is replaced by the minimum value or the maximum value before replacement in accordance with the mini-max theory. If the conclusion section of the above described replaced rule is a manipulation command, step 41 is executed. If the conclusion section is not coincident, step 37 is executed in order to further advance inference.

If the above described conclusion section is a manipulation command, the conclusion section and the degree of conviction derived at the above described processing step are outputted to the above described command value calculation means 33 at the processing step 41.

FIG. 9 shows the command value calculation means 33. The command value calculation means 33 comprises a memory 42 for storing the command, which is the result of inference derived by the above described manipulated variable determining means 32, and the degree of conviction thereof, step 43 for judging whether all of the commands in the memory have been processed or not and for finishing the operation of the command value calculation means 33 if all commands have already been processed, and processing step 44 for, in case all commands have not been processed yet, taking out commands for the depression control device 6 and actuators 7, 8, 9, 10 and 11, for deriving the average of the manipulated variable as described later on the basis of the degree of actuator manipulation and its degree of conviction derived by various kinds of inference, and for collecting averages of the manipulated variables of an identical actuator to derive a new average and use it in the command for the corresponding actuator.

Providing such command value calculation means 33 results in a feature that commands to be supplied to an actuator, which are individually derived by various kinds of inference 142 to 146, the feature extraction and answer device 110, the optimization arithmetic device 111 and general control device 203, can be jointly handled.

Figure 10:
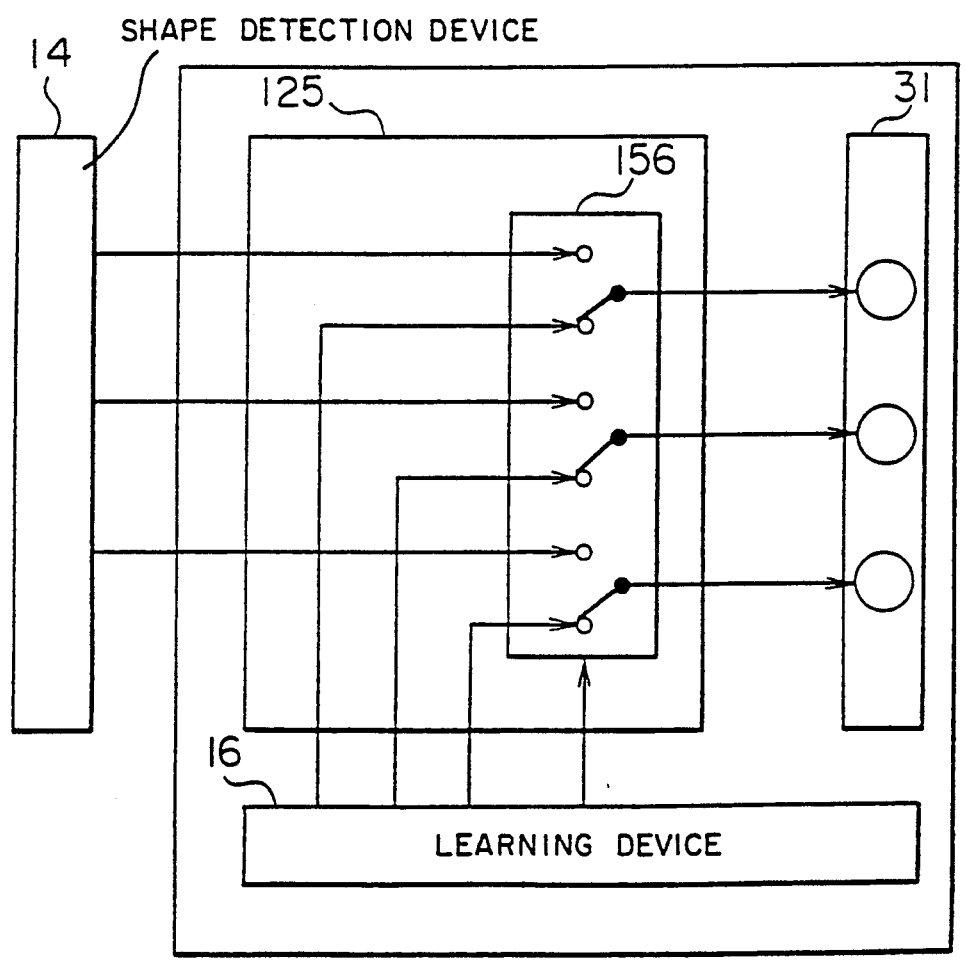
FIG. 10 is a block diagram showing the configuration of an input switching unit.

FIG. 10 shows the configuration of an input switching unit 125 required for the above described learning. By using a switch device 156 controlled by the learning device, the input switching unit 125 outputs either the output of the shape detection device 14 or the output of the learning device 16 to the input layer 31. The state of the switch device 156 shown in FIG. 10 represents the state in which learning is performed.

Figure 11:
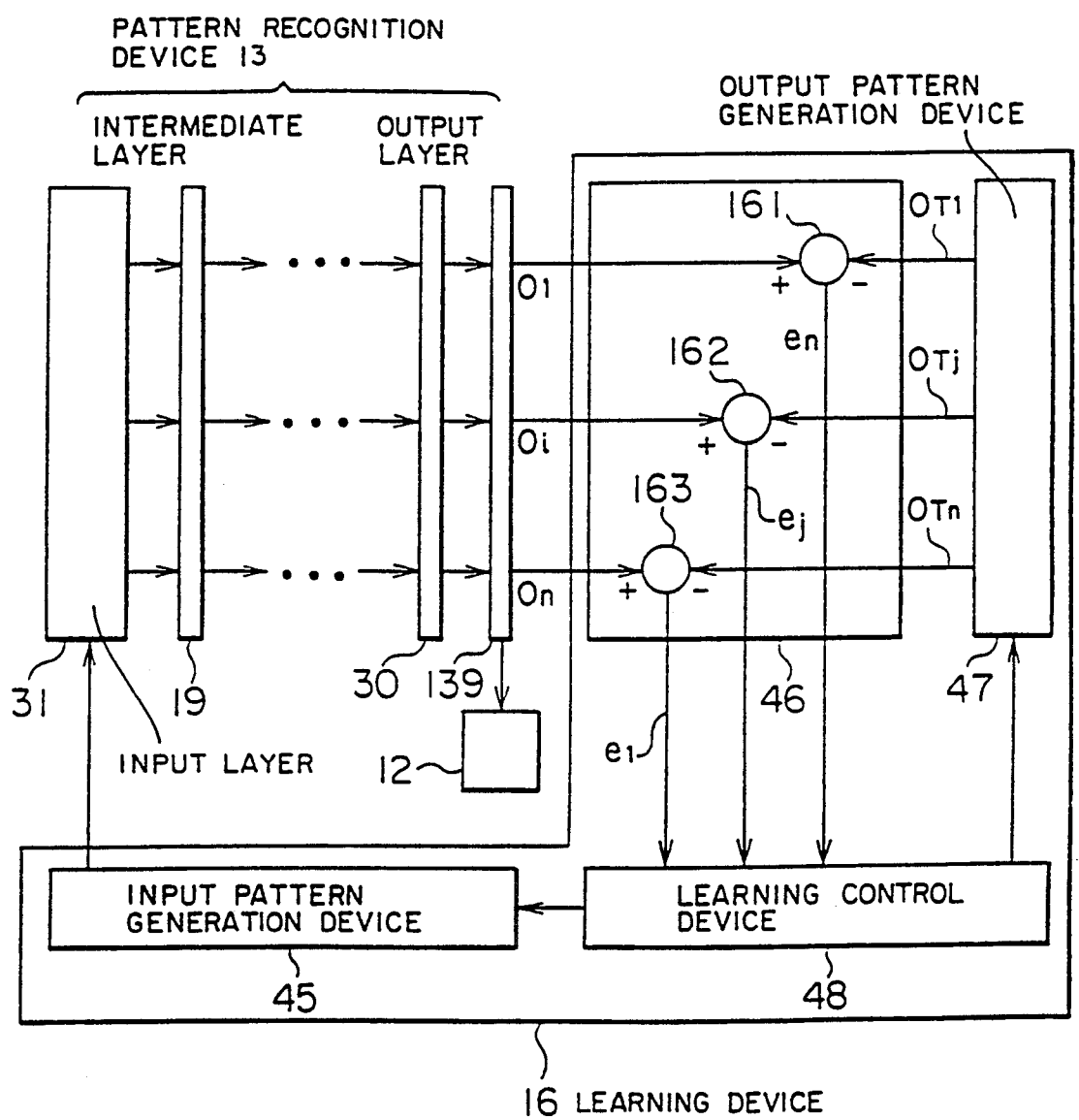
FIG. 11 is a block diagram showing the configuration of a learning device.
Figure 12:
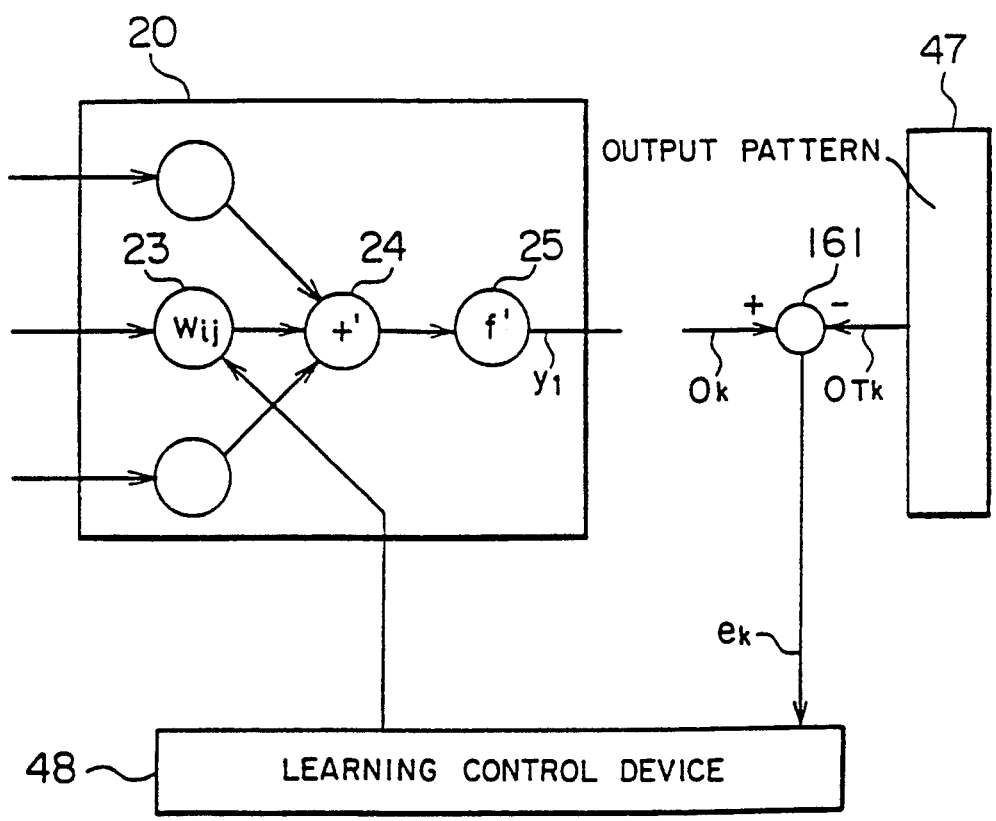
FIG. 12 is a diagram showing the relationship between the learning control device and the weighting function of a node.

FIG. 11 shows the configuration of the learning device 16. The learning device 16 comprises an input pattern generation device 45 for successively outputting a plurality of reference patterns prepared before hand, an output pattern generation device 47 for outputting a predetermined output bit pattern of the output layer 30 in response to each reference pattern, an output comparison device 46, and a learning control device 48. By using adders 161, 162 and 163, the above described output comparison device 46 derives difference values respectively between outputs $O_1$, $O_j$ and $O_n$ of a distributor 139 for outputting outputs of the output layer 30 to the command generation device and the above described comparison device 46 and outputs $O_{T1}$, $O_{Tj}$ and $O_{Tn}$ of the output pattern generation device 47 as deviations $e_1$, $e_j$, and $e_n$. The output comparison device 46 outputs the deviations $e_1$, $e_j$ and $e_n$ thus derived to the learning control device 48. Another function of the learning control device 48 is to determine the weighting functions of the intermediate layer as shown in FIG. 12 in response to the deviations. The outputs $O_1$, $O_j$ and $O_n$ of the distributor 139 are generated by the output of the input pattern generation device 45 inputted to the input layer 31 of the pattern recognition device 13 (i.e., neurocomputer of Rumelhart type).

FIG. 12 shows the relation between the weighting function $W_{ij}$ 23 and the learning control device 48 in the above described learning process. Upon receiving the deviation $e_k$ which is the output of the above described adder 161, the learning control device 48 changes the value of the weighting function $W_{ij}$ 23 of the cell 20 included in the pattern recognition device 13 in such a direction as to decrease the above described deviation so that the deviation may be minimized.

Figure 13:
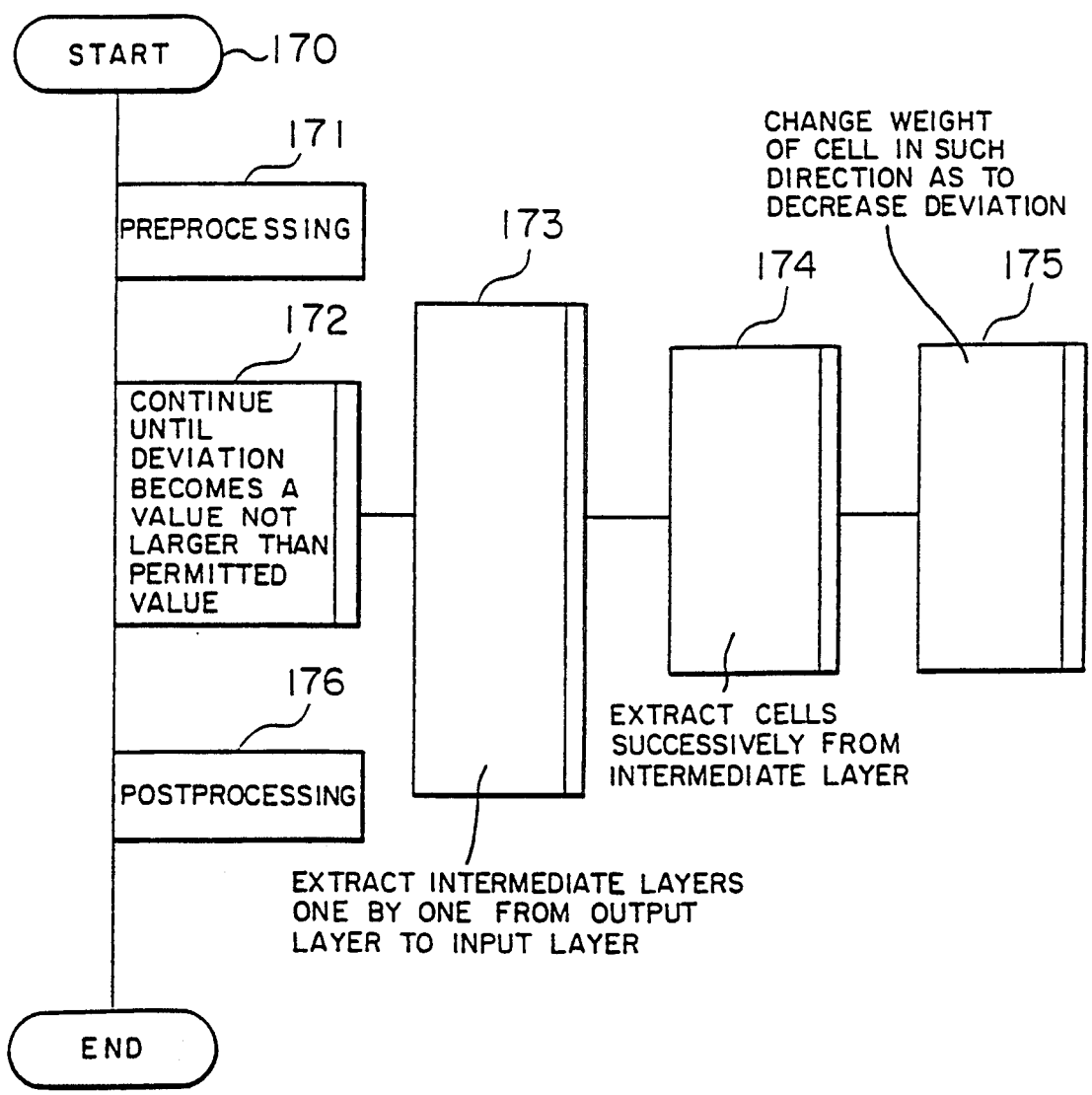
FIG. 13 is a flow chart showing the processing operation of a learning control device.

FIG. 13 shows processing summary 170 of the above described learning control device 48. When the learning device 16 is started, the processing 170 of the learning control device 48 is started. The processing 170 comprises preprocessing step 171 for starting the above described input pattern generation device 45 and output pattern generation device 47 to generate inputs which are teacher signals and desired outputs, step 172 for repeating succeeding steps 173, 174 and 175 until the square sum of the above described deviations comes into the permitted range, step 173 for successively extracting marked intermediate layers in order of direction pointing from an intermediate layer disposed near the output layer toward the input layer 31, step 174 for successively extracting marked cells in that intermediate layer, step 175 for changing the weighting function $W_{ij}$ 23 of the extracted cell in such a direction as to decrease the deviation $e_k$, and step 176 for finishing the learning process.

If a new phenomenon which has not been considered until then occurs and a countermeasure to this phenomenon is determined, that information can be reflected by providing the above described learning device, resulting in a feature.

Figure 14:
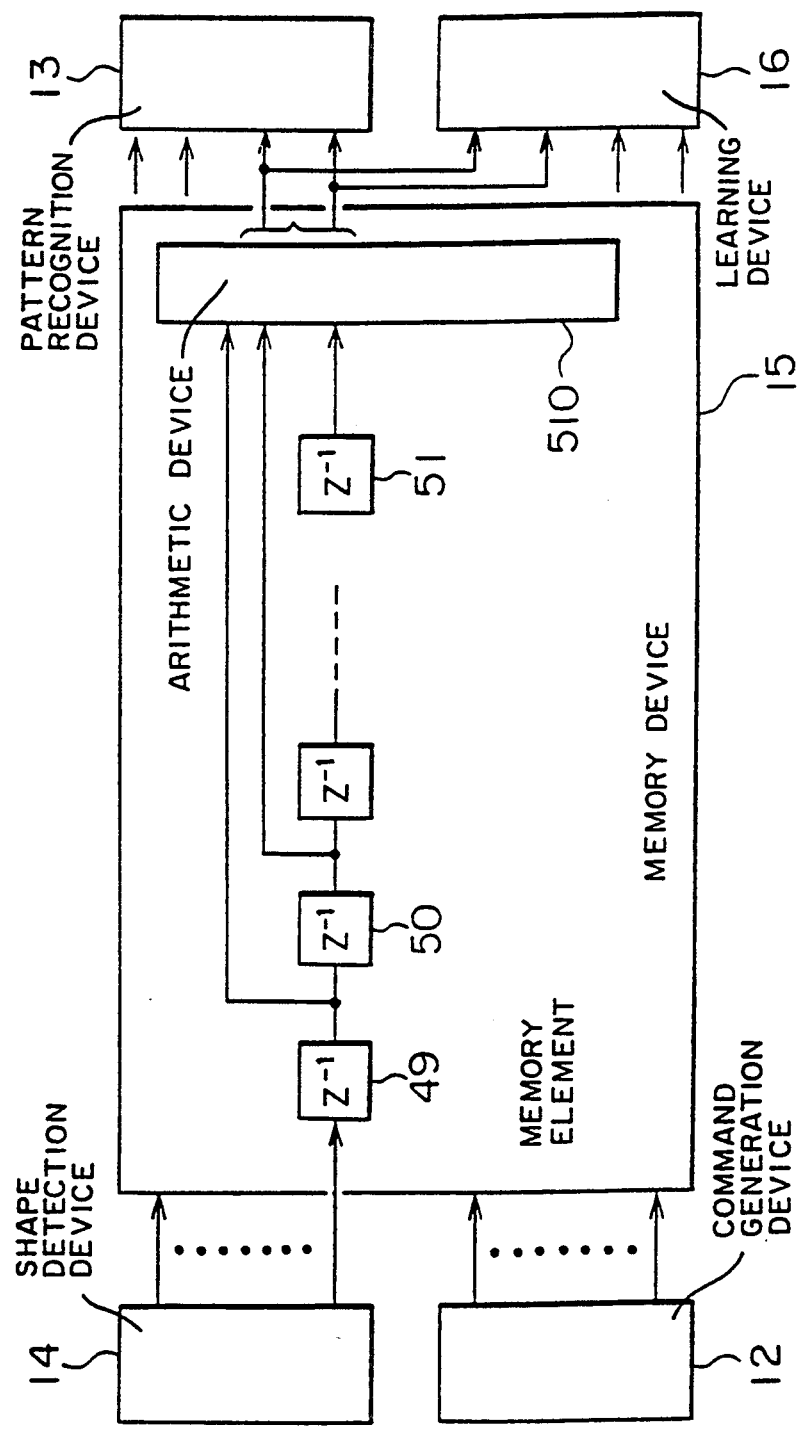

FIG. 14 shows the configuration of the memory device 15 shown in FIG. 2. The memory device 15 comprises a memory element 49 supplied with outputs of the command generation device 12 and the shape detection device 14, a memory element 50 whereto the contents of the memory element 49 are transferred after predetermined time has elapsed, and a memory element 51 whereat data transferred successively through memory elements arrive after specific time has elapsed. Contents of respective memory elements 49, 50 and 51 are inputted to the pattern recognition device 13 and the learning device 16 via an arithmetic device 510 for performing differentiation or integration with respect to time series change of the pattern.

Owing to this memory device 15, the change of the shape detection device 14 and the command generation device 12 can be considered. For example, operation such as differentiation or integration can be performed.

There is a certain time lag in the influence of the nozzle upon coolant control, and only a fixed length from the nozzle position is affected. Therefore, FIG. 15 shows a device for recognizing a pattern by using the time series input obtained near the nozzle. The output of the shape detection device 14 is inputted to a memory 52 of the pattern recognition device 13. The signal inputted to the memory 52 is inputted to a memory element 54. The signal inputted to the memory element 54 is inputted to memory elements 57 and 59 via gate circuits 55 and 56. When the gate circuits 53 and 56 turn off, the gate circuit 55 turns on. In synchronism with the clock, information of the memory element 54 is transferred to the memory element 57. Further, when a certain time has elapsed, the signal stored in the memory element 54 arrives at the memory element 58, and the signal stored in the memory element 57 arrives at the memory element 54. When signals stored in the memory elements 54, 57 and 58 make a round at the next clock, the gates 53 and 56 turn on and the gate 55 turns off. Contents of the memory element 54 are thus stored in the memory element 59, and information stored into the memory elements 54, 57 and 59 is inputted to the input layer 31.

By providing such a memory 52, the number of cells included in the input layer 31, the intermediate layers 19, 27 and 29, and the output layer 30 can be significantly decreased, resulting in an effect.

FIG. 16 shows an example in which a simulator 60 to be controlled is used in the input pattern generation device 45 and the output pattern generation device 47 of the learning device 16.

The shape pattern generated by manipulation of the operator or data in the output pattern generation device 47 is inputted to a command generation device 12, which has the same function as that of the command generation device 12 of FIG. 2 and which is separately provided in the learning device. In the command generation device 12, commands of various actuators are generated in response to a pattern. Those commands are inputted to the controlled simulator 60 disposed in the input pattern generation device 45. Operation of various actuators 6, 7, 8, 9, 10 and 11 as well as the rolling mill 1, which are to be controlled, is simulated. When the response is bad, the output of the above described simulator 60 to be controlled is so adjusted as to yield a desired shape by using a parameter adjustment device 61 for altering parameters of the command generation device 12 and the controlled simulator 50. The output of the controlled simulator is inputted to the pattern recognition device.

Operation of the control method of the configuration heretofore described will now be described by using concrete examples.

The initial value of the weighting function $W_{ij}$ 28 of the intermediate layers 19, 27 and 29 of the neurocomputer included in the pattern recognition device 13 is initially set at a random number and a suitable value such as half (0.5) of a value (which is now assumed to be 0 to 1.0) the weighting function can assume. Even if at this time a convex reference shape pattern generated by the input pattern generation device 45 shown in FIG. 17, for example, is inputted, the output on a signal line 70 so outputted from the output layer 30 as to indicate a concave shape does not become "1". Further, the degree of conviction of the convex shape outputted on an output line 71 of the output layer 30 does not become zero.

An output line 72 of the output pattern generation device 47 included in the learning device 16 corresponding to the output line 70 of the output layer 30 assumes "1". An output line 73 of the output pattern generation device 47 corresponding to the output line 71 assumes "0". Upon receiving from the output comparison device 46 the deviation between the ideal output (supplied from the output generation device 47) and the output of the pattern recognition device 13, the learning control device 48 changes the magnitude of the weighting function $W_{ij}$ of the pattern recognition device 13 in proportion to the magnitude of the deviation in such a direction as to decrease the deviation. As a representative example of this algorithm, there is the steepest slope method.

The weight of the weighting function is successively changed in accordance with the processing of FIG. 13. When the square sum of $e_k$ shown in FIG. 12 comes into the permitted range, the operation of the learning device 16 is finished.

If after completion of learning the same waveform as that of the output pattern of the input pattern generation device 45 shown in FIG. 17 is inputted from the shape detection device 14 shown in FIG. 2, the pattern recognition device 13 outputs "1" on the output line 70 of the output layer 30 and outputs "0" on the output line 71 of the output layer 30.

Succeedingly, a waveform shown in FIG. 18 and referred to as "convex waveform" is inputted. If learning is not finished yet, there might not be obtained such a pattern that the output on the output line 71 of the pattern recognition device 13 representing the convex shape assumes "1" and another output 70 becomes "0". By taking a typical convex pattern as the input signal as described before, the output pattern generation device 47 makes its outputs corresponding to the above described output lines 71 and 70 assume "1" and "0", respectively. The learning device 16 changes the weighting function $W_{ij}$. If the convex waveform shown in FIG. 18 is inputted to the above described pattern recognition device 13 when learning has been finished, the output line 71 of the above described output layer 30 assumes "1" and the output line 70 assumes "0".

If a waveform shown in FIG. 19(a) is inputted to the pattern recognition device 13, therefore, the degree of similarity to the convex waveform inputted beforehand as described before is outputted as the degree 50% of conviction from the output layer 30 on the output line 71 indicating the convex waveform. At the same time, the degree of similarlity is outputted as the degree 40% of conviction on the output line 70 indicating the concave waveform.

FIG. 20 shows the shape of a rolled material with regard to the change of the rolled material with time. In the state that the rolled material is just under the work roll 2 of the rolled mill, time is $t_o$ and the value at time $t_O$ is $x_0$. Assuming now that the sampling period of the computer is $T_0$, the height of plate thickness at time $t_1$ preceding $t_o$ by $T_O$ seconds is $x_1$, and the height of the plate thickness at time $t_2$ preceding $t_o$ by $T_0 \times 2$ seconds.

That is to say, the height $x_2$ is inputted to the memory device 15 at the time $t_2$ and stored into the memory element 49 shown in FIG. 14. If the height $x_1$ at $t_1$ which is the next sampling instant is inputted to the memory device 15, the data $x_2$ stored in the memory element 49 is transferred to the memory element 50 at that timing and contents of the memory element are rewritten to become $x_1$.

On the other hand, the arithmetic device performs various kinds of calculation by using the contents of the above described memory elements 49 and 50. When a differentiator is necessary, for example, it is obtained by executing calculation represented by $(x_2-x_1)/T_0$. When an integrator is necessary, it is obtained by executing calculation represented as $(x_1+x_2) \times T_0$. That is to say, since the differentiator provides the speed of the shape change, the pattern recognition device 13 is able to improve its responsiveness to a change.

On the other hand, the integrator is able to provide a feature such as noise removal.

It is possible to provide the pattern recognition device 13 with functions of the above described differentiator and integrator as well as a proportional element which does not contain a time element.

Further, as occasion demands, data stored in the memory device 15 can also be used in the input pattern generation device 45 which is utilized at the time of learning.

It is now assumed as shown in FIG. 21 that the plate thickness of the rolled material in the roll axis direction of the rolling mill at the time $t_o$ is represented as $x^0{}_0, x^0{}_1, ..., x^0{}_{n-1}, x^0{}_n$ and the state of the plate thickness at time preceding $t_o$ by $T_O$ (sampling period) at the same position is represented as $x^1{}_0, x^1{}_1, ....., x^1{}_{n-1}, x^1{}_n$. At the time $t_0$, $x^0{}_n, x^0{}_{n-1}, ....., x^0{}_0$ are respectively stored into the memory elements 54, 57 and 58 of FIG. 15. Since operation similar to that of the above described memory device 15 is performed, data $x^1{}_0, x^1{}_1, ....., x^1{}_n$ at time $t_0$ preceding the time $t_0$ by $T_0$ are stored into memory elements beginning with the memory element 59.

FIG. 22 shows an example of the production rule or fuzzy rule. (This example correspond to the production rule 147 and the fuzzy rule 148 shown in FIG. 6.)

If the output of the degree of conviction 40% with respect to the concave shape pattern is obtained from the pattern recognition device 13, it is collated with the premise section of the production rule, and it coincides with a concave rule 80. As a result, a rule 81 which weakens the bender (the degree is small) is obtained. On the other hand, the degree of conviction with respect to the convex shape pattern is 50%. It coincides with the premise section 82. As a result, conclusion that "strengthen bender (degree is big)" is obtained.

As a result of collation with the above described rule, the degree of conviction of the convex shape is 50%. Therefore, the manipulated variable of the bender in the command generation device 12 is represented by the area of a shaded region in B as shown in FIG. 23. On the other hand, the degree of conviction of the concave shape is 40% and is indicated by S, the manipulated variable is represented by the area of a shaded region in S shown in FIG. 23. Succeedingly, the manipulated variable of the bender in the above described command generation device 12 becomes 53% which is the value of a centroid C obtained by compounding the centroids A and B of the shaded regions.

In other words, the centroid of each triangle in FIG. 23 represents the amount of manipulation of the bender when the rule corresponding to that triangle is selected. More specifically, when the triangle S is selected, the command for the amount of manipulation of the bender is determined to apply 20% of the maximum value thereof corresponding to the point A in the triangle S, while when the triangle B is selected, the command for amount of manipulation of the bender is determined to apply 80% of the maximum value corresponding to the point B in the triangle B. These triangles are obtained by inference according to rules so that a plurality of different commands (corresponding to the respective triangles) for amount of manipulation of a given actuator may be obtained. It is required to determine one definitive command from the plurality of different commands in such case. This is done by obtaining the centroid of the whole area composed of the plurality of triangles and the value corresponding to the centroid is used for the actual command. In FIG. 23, the degree of certainty for the rule represented by the triangle S is 40% (corresponding to the shaded area in the triangle S) and the amount of manipulation of the bender under this rule is 20% of the maximum or rated value thereof. On the other hand, the degree of certainty for the rule represented by the triangle B is 50% and the amount of manipulation of the bender under this rule is 80% of the maximum or rated value thereof. By composing these two triangles, the desired value for the amount of manipulation of the bender is determined from the centroid C of the whole area composed of the two triangles which is calculated by the following equation:

$$\text{The amount of manipulation} = \frac{(0.4 \times 0.2) + (0.5 \times 0.8)}{0.4 + 0.5}$$
$$= 0.53$$

In case the influence of the actuator is local as in coolant control unlike the bender or shifter, a waveform as shown in FIG. 24(a) is stored into the memory elements 54, 57 and 58. A part of the waveform stored in the memory elements (part (a) of FIG. 24(a)) is processed in the pattern recognition device 13 and the command generation device 12. By controlling one nozzle A of the coolant control device 10, the quantity of cooling fluid is controlled and the roll is flattened.

If $x^0_{n-1}$ of FIG. 21 corresponding to the nozzle A is larger than values of $x^0_n$ and $x^0_{n-2}$ adjacent to it, conclusion 85 that "the central part is larger" is obtained from FIG. 22. On the other hand, if $x^0_{n-1}$ and $x^1_{n-1}$ are positive, $x_{n-1}$ tends to increase. Therefore, the differential coefficient becomes positive, and coincidence with a premise section 86 occurs, thereby the coolant being turned on. Its degree is big (B). As a result, $x^0_{n-1}$ and $x^1_{n-1}$ little change.

If the control of the nozzle A is finished, contents of the memory elements 54, 57, 58 and 59 shown in FIG. 15 are shifted one by one. As a result, the waveform of a region (b) shown in FIG. 24(a) is inputted to the pattern recognition device 13. Processing steps 13 and 12 are executed, and one nozzle B of the coolant control device 10 is controlled.

By performing processing in this way, the pattern starts from (A) of FIG. 24(a) and arrives at (B). By further shifting the memory contents, the waveform of FIG. 24(a) reappears in the memory 52. When predetermined time has elapsed since storage of the pattern of FIG. 24(a) into the memory 52 the last time, contents of the memory element 54 shown in FIG. 15 are transferred to the memory element 59, and the waveform of the shape detection device 14 is stored into the memory element 54.

As evident from FIG. 14, it becomes possible to control the speed of waveform change or the like by disposing the arithmetic device 510 shown in FIG. 14 between the memory 52 and the input layer 31.

The learning method of the pattern which becomes the reference of the pattern recognition device 13 will now be described.

Waveforms 62 and 63 shown in FIG. 19 are generated by the input pattern generation device 45 of FIG. 11 and outputted to the input layer 31. This pattern is written into a memory of the input patterns generation device 45, or a pattern stored in the memory device 15 of FIG. 12 is used. The signal inputted to the input layer is passed through the intermediate layers 19, ..., 27 to appear as the output from the output layer 30. At this time, the weighting function $W^k_{ij}$ of the intermediate layer is the initial value. A predetermined output pattern which should be outputted from the pattern recognition device 13 is so inputted from the output pattern generation device 47 to the comparison device 46 as to correspond to the output of the input pattern generation device 45. (The above described predetermined output pattern which should be outputted from the pattern recognition device 13 is such a pattern that if the input pattern generation device 45 contains the standard pattern and one output terminal of the output layer is assigned to that standard pattern, the assigned output terminal may become "1" whereas other terminals may become "0".) When learning is not completed yet, the output pattern of the output layer 30 might be different from the waveform of the output pattern generation device 47. As a result, the comparison device 46 outputs output depending upon the degree of pattern difference. By deriving the mean square of these deviations, the power spectrum of the like of deviations is obtained. Depending upon the above described deviation, the weighting function $W^k_{ij}$ is changed successively in intermediate layers ranging from the intermediate layer 27 disposed near the output layer to the intermediate layer 19 disposed near the input layer 31. As the scheme for changing the weighting function $W^k_{ij}$, various methods can be considered. However, it is an optimization problem for minimizing the above described deviation. For example, the steepest slope method or the like is used. In a concrete method, the marked weighting function is varied slightly in the upward direction. By watching the direction in which the deviation value changes, the value $W^k_{ij}$ of the weighting function is moved in such a direction as to decrease the deviation value. The amount of movement is made large when the change of the deviation value is small. When the change of the deviation value is large on the contrary, the amount of movement is made small. When alteration of the weighting function $W^k_{ij}$ of the intermediate layer 19 nearest the input layer has been finished, the deviation value of the comparison device 46 is checked again. When the deviation value comes into the permitted error range, the learning is finished.

This control is executed in the learning control device 48. The reason why the pattern recognition device 13 is using the result of this learning for pattern discrimination can distinguish the pattern and the reason why the learning works well are not explained. However, it is said that the weighting functions are larger in number than the inputs and outputs and have degrees of freedom in values and a fine recognition result can be obtained even if the values deviate somewhat or even if many patterns are stored.

On the other hand, there is a very difficult aspect with respect to what pattern should be used for the input pattern generation device 45 and the output pattern generation device 47. Fortunately, a method whereby the model can be accurately derived if the controlled system 1 is operated near a certain operation point is established in the field of control theory as the theory referred to as system identification. In the whole operation region, however, it is difficult to model for an object having high nonlinearity.

Therefore, a model is made in a specific operation region, and a control is executed. In relationship between the input of the control system and the response thereof is derived by simulation, and it is used as data for learning. For the entire operation region of the control system, the operation point is successively moved. The optimum modeling and control command on each occasion are derived to effect learning. That is to say, parameters of the simulator 60 to be controlled as shown in FIG. 16 are adjusted, and the simulator 60 is operated accurately at a specific operation point. Thereafter, the input pattern generation device 47, the parameter adjustment device 61, the controlled simulator 60 and the command generation device 12 are so operated that the controlled system may generate the typical pattern. Outputs of the processing 47 and 60 are used as the output pattern and the input pattern of the learning device 16, respectively.

By using the control scheme having such configuration, it is possible to abstract the object waveform in the pattern recognition device and execute control including even vagueness in the control device.

An embodiment of the present invention has heretofore been described by using a rolling mill system as a specific example. However, it is not necessary to limit the controlled system 1 and various actuators 6, 7, 8, 9, 10 and 11 to a rolling mill system. It is self-evident that the present invention can be applied to general controlled systems, actuators and controllers. For example, the present invention can be applied to control of a system such as the railway running management system in which a train schedule pattern is recognized and a delayed train is returned to the normal schedule in accordance with various schedule rearrangement rules. That is to say, train running is represented by a schedule, and a feature of delay is extracted by the pattern recognition device 13. On the basis of that feature value, the inference device makes a schedule by using various rules such as a rule specifying that outrunning of a train should be performed at a station. Upon receiving the result obtained in that inference device, the command value calculation device 33 generates running commands of individual trains. Trains which are actuators run in accordance with the above described commands.

In a scheme for controlling a pattern as in the shape control of a rolling mill, the present embodiment makes it possible to realize a scheme for modeling the waveform resulting from control, judging the feature of the waveform, and performing control in accordance with the feature like a skilled operator. Even if a new situation should occur, it is dealt with learning. Therefore, an effect that flexible and high-quality control can be effected is obtained.

An embodiment of coolant control of a rolling mill according to the present invention will now be described.

Coolant control is performed by jetting coolant from a large number of nozzles disposed in the width direction of the rolled material. Ejection of coolant from nozzles undergoes ON-OFF control. Which nozzle among a large number of nozzles jets coolant is determined by the magnitude of deviation between the actual shape of the rolled material in the cooling region of the rolling roll and the desired shape. Such coolant control is performed by proportionate control because the thermal model of the roll is extremely complicated. Since control with due regard to other factors of shape change caused by thermal crown cannot be performed, however, shape control with sufficiently high precision cannot be performed, resulting in a problem. Especially in recent years, the plate thickness of the rolled material becomes thin. As the requirement with respect to the shape of the rolled material becomes stringent, high precision of shape control is highly demanded.

In FIG. 25, a rolling mill 1 comprises a pair of work rolls 2 opposed each other, a pair of intermediate rolls 4 having the work rolls 2 put between them, and a pair of backup rolls 5 having the intermediate rolls 4 put between them. A rolled material is placed between the work rolls 2. Rolling force applied to the backup rolls 5 is applied to the rolled material 3 via the intermediate rolls 4 and the work rolls 2. That force acts as plastic deformation force and elastic deformation force of the rolled material 3 to make the plate thickness of the rolled material 3. Rolling is thus performed. Since the backup rolls 5 are rotated, however, rolling force cannot be directly upon the roll faces uniformly. That is to say, rolling force is applied to the axes of the backup rolls by a depression device which is not illustrated. The backup rolls 5 deform. By deformation of the backup rolls 5, rolling force applied to the intermediate rolls 4 becomes uneven, and the intermediate rolls 4 are also deformed. Deformation of the intermediate rolls 4 causes deformation of the work rolls 2. Finally, it becomes impossible to apply uniform rolling force to the rolled material 3 in the roll axis direction. As a result, flatness of the rolled material 3 in the width direction is hampered. In order to prevent this, a work roll bender 7 for applying bending force $F_w$ to the work rolls 2, an intermediate roll bender 8 for applying bending force $F_I$ to the intermediate rolls 4, and an intermediate roll shifter 9 for moving the intermediate rolls in the roll axis direction are disposed as described before. By using these kinds of bending force and movement of rolls, unflatness which can be approximated with the n-th (where n=2, 3, 4 .....) curve can be removed from the rolled material 3.

In the rolling mill 1, however, thermal expansion is caused in the work rolls 2 of the rolling mill 1 by loss heat generated in rolling operation. This heat is generated by nonuniformity of the material of the rolled material 5 and nonuniformity of composition of the work roll 2. The amount of generated heat and the amount of heat stored in the roll become local when they are watched for a short time which is in control period order. This local thermal expansion cannot be removed by bending force $F_w$ and $F_I$ as well as roll shift US. Therefore, shape control is executed by coolant control. A roll cooling unit 10a jets coolant onto the surface of the roll 2 by controlling a plurality of nozzles disposed in the width direction of the rolled material 3. The roll cooling unit 10a is controlled by the coolant control unit 10. A shape detector 14 is disposed in the output side of the rolling mill 1 to measure the shape of the rolled material 3 in the width direction. The shape detector 14 typically comprises a large number of thickness gauge meters juxtaposed in the width direction. The shape signal detected by the shape detector 14 is inputted to a converter 14a for shape detection to undergo noise removal. The shape signal outputted from the shape detection converter 14a is supplied to the coolant control unit 10 for determining the manipulated variable of the roll cooling unit 10a. The coolant control unit 10 functions to perform a fuzzy inference calculation and determine the manipulated variable of the roll cooling unit 10a. The coolant control unit 10 comprises as many nozzle control units 311 for controlling respective nozzles of the roll cooling unit 10a as nozzles. The nozzle control unit 311 comprises a shape deviation absolute value control section (hereafter referred to as P element control section) 312, a shape time deviation control section (hereafter referred to as D element control section) 313, a shape position deviation control section (hereafter referred to as X element control section) 314, and an evaluation section (hereafter referred to as E element section) 315.

Assuming now that the nozzle control unit 311 controls the i-th nozzle, the P element control section 312 takes therein the shape signal (plate thickness signal) i of the rolled material 3 corresponding to the position of the i-th nozzle, and generates a control command for the i-th nozzle. On the basis of the difference between the last value of the shape signal and the current value thereof, the D element control section 313 generates a control command of the i-th nozzle with due regard to time factor such as differention or integration. With due regard to relations between the shape signals i−1 and i+1 of shape detectors 14, which are adjacent to the shape detector 14 generating the shape signal i, and the element control section 314 generates a control signal for the i-th nozzle. The E element section unifies control sections of the P element control section 312, the D element control section 313 and the X element control section 314, and generates a concrete control signal (i.e., manipulated variable) for the i-th nozzle.

FIG. 26 is a detailed diagram of a part of the roll cooling unit 10a.

The roll cooling unit 10a comprises a tank 316 for storing coolant, and piping 319 for carrying the coolant to nozzles 318 via valves 317. The valves 317 undergo ON-OFF control by the control signal (i.e., manipulated variable of the roll cooling unit) supplied from the coolant control unit 10 and controls coolant supplied from the nozzles to the work roll 2. The shape detector 14 comprises a large number of gauge meters 321 so disposed as to correspond to positions of the nozzles 318.

FIG. 27 shows the detailed configuration of the X element control section 314. Plate thickness signals i−1, i, and i+1 respectively of the (i−1)-th, i-th and (i+1)-th gauge meters 321 are inputted to a preprocessing unit 322. The preprocessing unit 322 derives deviation $\epsilon_{1-1}$ between the plate thickness signals i and i−1 in an adder 326 and derives deviation $\epsilon_1$ between the plate thickness signals i and i+1 in an adder 327. The deviations $\epsilon_i$ and $\epsilon_{1-1}$ become shape position deviation. The deviations $\epsilon_1$ and $\epsilon_{1-1}$ outputted from the preprocessing device 3 are inputted to two classification devices 323A and 323B, respectively. Each classification device classifies the inputted deviation into a plurality of classes predetermined by the magnitude of the position deviation and outputs the degrees of conviction that the input deviation belongs to respective classes. The degrees of conviction derived by the two classification devices are inputted to inference devices 324A and 324B, respectively. The inference device 324 refers to an inference rule base 325, determines a control signal on the basis of deviations $\epsilon_i$ and $\epsilon_{i-1}$, and supplies the control signal to the E element control section 315.

FIG. 28 shows detailed configuration of the P element control section and the D element control section 313.

The plate thickness signal i is inputted to a classification device 323C of the P element control section 312 to yield its degree of conviction. The degrees of conviction thus derived are inputted to an inference device 324C. The inference device 324 derives a control signal while referring to an inference rule base 325 and outputs the control signal to the E element section 315.

Further, the D element control section 313 subtracts the plate thickness signal i obtained one sampling before and passed through a delay unit 328 from the current plate thickness signal i by using an adder 329 and thereby derives the shape time deviation. This shape time deviation is supplied to a differentiation circuit 330 having a gain equivalent to the reciprocal of the sampling period T to yield the differential signal of the plate thickness signal i. This differential shape signal is supplied to a classification device 323D. On the basis of degrees of conviction thus derived, inference processing is executed in an inference device 324D.

Differentiation may also be performed by using an integral element in digital control, a multi-stage differential element or integral element.

FIG. 29 is a detailed diagram of an example of the classification device 323.

The classification device 323 comprises as many sorting elements as a number corresponding to the number of classes in order to derive respective degrees of conviction that the input signal (shape signal) I belongs to a plurality of predetermined classes. In the embodiment, three classes referred to as "small deviation S", "medium deviation M" and "large deviation L" are provided. Therefore, three sorting elements 331, 332 and 333 are so provided as to correspond to these three classes. The sorting element 331 has a sorting function as illustrated. The abscissa represents the magnitude of the input signal I, and the ordinate represents the magnitude of the outputted degree of conviction S. The sorting function of the sorting element is represented by solid lines, and sorting functions of other sorting elements are represented by broken lines. If the value of the input signal I is a, the output representing the degree of conviction that the input signal a belongs to the class S becomes b. In the same way, the sorting element 332 indicates the fact that the degree of conviction that the value a of the input signal I belongs to the class M is c. Further, the sorting element 333 indicates the fact that the degree of conviction that the value a of the input signal I belongs to the class L is 0.

In FIG. 29, outputs of the sorting elements 331, 332 and 333 represent degrees of conviction associated with the classes referred to as "small (S)", "medium (M)" and "large (L)", respectively. With due regard to various conditions, however, the number of sorts can be increased or decreased.

FIG. 30 shows the detailed configuration of the inference device 324. The class and degree of conviction outputted from the classification device are stored into a memory device included in the inference device 324.

The degrees of conviction stored in the memory device 334 are taken in an inference section 335 one by one. The inference section refers to an inference rule base 325, determines a control rule to be applied, and outputs a command signal used as a control command to the E element section 315 which is the evaluation device.

Processing procedure of the inference section 335 will now be described by referring to FIG. 31.

At step 336, the class used for inference is first taken out from the memory device 334, and it is stored into a register (not illustrated) as the result in the midst of inference. In addition, processing of taking out a first rule from the inference rule base 325 is executed. At step 337, it is judged whether contents of the premise section of the inference rule coincides with contents of the register or not. If the result of judgment is "coincidence", it is judged at step 338 whether the conclusion section of that coincident inference rule is a manipulation instruction for the roll cooling unit 10a or not. If it is judged at step 338 that the conclusion section is a manipulation instruction, the conclusion section is multiplied by the degree of conviction, and the resultant product is outputted to the E element section 315, which is the evaluation section, as the control signal at step 339. At step 340, it is judged whether there is data to be inferred or not in the memory device 334. If there is no data, processing of the inference section 335 is finished. If there is data to be inferred, processing of the step 336 is executed. If the result of judgment at the step 337 is "noncoincidence", the next inference rule is taken out from the inference rule base 325. If it is judged at the step 338 that the conclusion section is not a manipulation instruction, contents of the register are replaced by the conclusion section of the inference rule and first one rule is taken out from the inference rule base 325 at step 342.

Respective control signals (manipulated variables) thus derived by inference calculation are evaluated in the evaluation section 315 as described below.

Operation of the evaluation section (E evaluation section) 315 will now be described by referring to FIG. 32.

· Control signals A, B and C outputted from the inference device 324 are inputted to the E element section 315 which is the evaluation device. As one form of the control signals A, B and C, a summary of the signal C is shown in block 343. The control signals A, B and C are obtained by deriving manipulated variables corresponding to respective classes classified as described before, in the above described inference section on the basis of the inference rule base. Each signal does not conclusively indicate a certain manipulated variable but indicates a manipulated variable belonging to a certain range corresponding to the range covered by the corresponding class. The base of a triangle shown in the block 343 indicates the range of the manipulated variable of the pertinent nozzle caused by the control signal C. The ratio of the area of the shaded region to the area of the entire triangle indicates the degree of conviction of the signal C (which is the degree of conviction derived by the above described classification device). The control signals A, B and C each representing the shape of a triangle similar to that shown in the block 343 are inputted to the E element section 315. The E element section 315 derives areas of shaded regions respectively of the control signals A, B and C and outputs the position of the centroid of the compounded areas to the roll cooling unit 10a as a command signal for the nozzle.

Assuming now that magnitudes of manipulated variables of the control signals A, B and C are respectively $\rho_1$, $\rho_2$ and $\rho_3$ and degrees of conviction of the control signals A, B and C are respectively $CF_1$, $CF_2$ and $CF_3$, the manipulated variable $\rho_i$ of the i-th nozzle is given by the following equation.

$$\rho_i = \frac{\Sigma \rho_i CF_j}{\Sigma CF_j} \quad (1)$$

Into the inference rule base 325, knowledge as shown in FIG. 33, for example, is stored. Knowledge has a form represented as "if X, Y". "X" corresponds to the premise section, and "Y" corresponds to the conclusion section. For example, the rule No. i means "if the difference between a certain point and its adjacent point is large, the manipulated variable of the nozzle is large". The conclusion section represents the manipulated variable of the nozzle or the state of shape. The conclusion section representing the state of shape such as rule j is used for multistage inference such as a syllogism.

Operation of the shape control unit configured as heretofore described will hereafter be described by referring to FIGS. 34A and 34B.

FIG. 34A shows the waveform of the shape signal which is detected by the shape detector 14 and inputted to the coolant control unit 10 via the shape detection converter 14a. The abscissa represents Channel No. and position of the thickness gauges 321 having Channel Nos. successively assigned thereto from the leftmost end. The ordinate represents the absolute value of deviation from the desired plate thickness. A thick line represents a shape pattern which is distribution of plate thickness deviation at current sampling instants (current values). A thin line represents a shape pattern obtained one control sampling period before (last value). An arrow directed from the thin line to the thick line represents the direction of change in shape pattern. In FIG. 34A, the left side with respect to the 10-th thickness gauge 321 (hereafter referred to as channel 10) is in the direction of improvement, whereas the right side is in the direction of aggravation.

With respect to deviation a of channel 3, it is now assumed that the classification device 323 of the P element section 312 outputs "large deviation with the degree of conviction 0.9" and "medium deviation with the degree of conviction 0.1", for example. The inference device 324 stores control signals "large deviation with the degree of conviction 0.9" and "medium deviation with the degree of conviction 0.1" into the memory device 334. In accordance with processing as shown in FIG. 31, the inference section 335 derives rule k "if absolute value of deviation is large, manipulate variable is large" stored in the inference rule base 325 as shown in FIG. 33, which coincides with "large deviation" included in the control signal "large deviation with the degree of conviction 0.9" stored in the memory device 334. The inference section 335 makes the degree of conviction for large manipulated variable equivalent to 0.9 and outputs it to the E element section 315 which is the evaluation device. Since the inference in this case is "medium deviation with the degree of conviction 0.1", "medium manipulated variable with the degree of conviction 0.1" is simultaneously outputted.

Further, by using the control signals "large manipulated variable with the degree of conviction 0.9" and "medium manipulated variable with the degree of conviction 0.1", a manipulated variable a representing the degree of necessity of applying coolant is derived in the E element section 315, which is the evaluation device of the P element section 312, as shown in FIG. 34B. For brevity of description, explanation of the operation of the X element section 314 and the D element section 313 is omitted. However, the manipulated variable a incorporates the influence of the element sections 313 and 314.

As for channel 7 of FIG. 34A, deviation b is medium, and hence the manipulated variable b shown in FIG. 34B also becomes medium. Further, since deviation c of channel 10 is zero, the manipulated variable c becomes zero. In this way, it is understood that the manipulated variable is large if deviation is large and the manipulated variable is also small if the absolute value of deviation is small.

The P element section 312, the X element section 314 and the D element section 313 have identical configuration with the exception of signal used for inference, i.e., rule of the inference rule base 325 used in the inference section 335. Centering around the movement of rule and inference, therefore, operation of the X element section 314 and the D element section 313 will hereafter be described.

On the basis of the shape position deviation from the adjacent point, the inference device 324 of the X element section 314 determines the controlled variable. For example, point d of channel 8 shown in FIG. 34 has small deviation with respect to channel 7, but has large deviation with respect to channel 9. At this time, rule i of FIG. 33, i.e., "when deviation between this point and its adjacent point is large, the manipulated variable is large" is selected. On the other hand, point b of channel 7 shown in FIG. 34A has small deviation with respect to its adjacent point, and hence "the manipulated variable is small" is selected. As a result, manipulated variables of the channels 7 and 8 respectively become b and d as shown in FIG. 34B, and the manipulated variable d of the channel 8 having large deviation with respect to its adjacent channel becomes larger than the manipulated variable b.

A change in manipulated variable caused by the D element Section 313 will now be described. As for the shape of last sampling and current shape pattern, the left side (channels 1 to 9) of channel 10 is in the direction of improvement and the right side (channels 11 to 20) is in the direction of aggravation.

As for point a of channel 3 shown in FIG. 34, the last sampling value is large and the current sampling value is medium. Therefore, the rule j of the inference rule base 325 as shown in FIG. 33 is satisfied. The inference section of the D element section 313 thus derives conclusion that the shape changes in better direction. At step 338 of FIG. 31, however, the conclusion is not a manipulation instruction. Therefore, inference is further advanced, and coincidence with rule j+2 that shape changes in the direction of improvement is found. Conclusion that the manipulated variable is small is thus obtained.

On the other hand, point e of channel 18 shown in FIG. 34A has the same absolute value of deviation as that of point a. However, its shape change is in the direction of aggravation. This case coincides with rule j+1 of FIG. 33 that the manipulated variable becomes large if the shape change is in the direction of aggravation As a result, the manipulated variables a and e are obtained, and the manipulated variable e becomes large.

Upon receiving the manipulated variables of respective channels shown in FIG. 34B in which output results of the E element section 315 are put in order, the coolant control unit 10 generates the manipulation signal of the valve 317 of the roll cooling unit 10a by considering the characteristic of the valve 317. If the valve 317 performs binary value operation, i.e., ON/OFF operation, for example, a threshold value is defined and a pattern as shown in FIG. 34C which represents the manipulation signal of the valve is so generated that the manipulation signal may become ON if the valve indicated by a broken line in FIG. 34B is exceeded and the manipulation signal may become OFF if the value indicated by the broken line is not exceeded. The quantity of coolant is thus controlled.

FIGS. 35A and 35B are characteristic diagrams showing results of simulation for comparing the present invention with the prior art. FIG. 35 shows initial values of the shape pattern supplied as disturbance. A thin line of FIG. 35B represents the shape pattern obtained by control of the prior art and a thick line represents the shape pattern obtained by control of the present invention. Improvement on the whole as compared with control of the prior art is appreciated from FIG. 35B.

In the above-mentioned embodiments, the present invention is applied to a control of the shape in distribution of thickness in the widthwise direction of a rolled material. However, the present invention can be also applied to a control of the shape in waviness of the rolled material represented by the distribution of the rate of longitudinal extension of the rolled material along its widthwise direction. This shape is generally detected by a shape detector disposed in place of the shape detector in FIG. 25 for measuring the distribution, along the widthwise direction of longitudinal tension applied to the rolled material.

In the present embodiment heretofore described, control is performed on the basis of not only the absolute value of the shape deviation but also factors of the shape position deviation and shape time deviation changing with time. Therefore, disturbance of each factor aggravating the shape can be removed. Shape control with high precision becomes possible.

In the above described embodiment, shape position deviation values with respect to adjacent shape detectors are derived. As a matter of course, however, shape position deviation values with respect to still more shape detectors may be detected depending upon the thermal characteristics of the roll.

Further, it is evident that the present invent can be applied to even a system in which the quantity of coolant can be continuously adjusted.

We claim:

1. A control system for controlling a predetermined characteristic of a subject which is controlled by a plurality of actuators, said control system comprising:
   a plurality of detection means for detecting a plurality of different data relating to respectively different presentations representing the predetermined characteristic of said subject and for producing output signals used for control of each of said actuators in response to the detected different data; and
   optimality decision means for synthetically judging a state of said characteristic of said subject on the basis of the output signals of said plurality of detection means in accordance with a predetermined rule and for supplying a control command for each of said plurality of actuators on the basis of a result of said judging.

2. A control system according to claim 1, wherein said optimality decision means comprises:
   means for determining a feature of said characteristic represented by each of the output signals of said detection means;
   memory means for storing a plurality of control rules, each rule determining a relation between the feature of said characteristic represented by each of the output signals and a manipulated variable of each of said actuators;
   means for determining the manipulated variable of each of said actuators on the basis of said determined feature of said characteristic represented by each of the output signals and one of said control rules associated with the output signal; and
   means for synthetically judging said manipulated variable of each of said actuators determined in correspondence to the output signals providing the control command for each respective one of said actuators.

3. A control system according to claim 2, further comprising:
   teaching means for judging whether the means for determining if the manipulated variable operates satisfactorily and for changing said control rule as used on the basis of the judging.

4. A control system according to claim 1 wherein one of said different data represents a time-variation of the parameter and one of said plurality of detection means comprises:
   means for detecting instant values of the parameter;
   memory means for storing the instant values; and
   means for introducing one of the output signals which is relating to a time-variation of the parameter based on the instant values of the parameter as stored in the memory means.

5. A system for controlling a predetermined characteristic of a given subject which is controlled by controlling a plurality of actuators, said system comprising:
   detection means for detecting a plurality of different data relating to an instant state and a time variation, respectively, of a presentation representing said predetermined characteristic of said subject and for providing a plurality of evaluations relating to a control of each of said plurality of actuators in response to said different data; and
   optimality decision means for judging a state of said characteristic of said subject on the basis of said plurality of evaluations and for determining an optimum controlled variable of each of said actuators so as to attain a desired state of said characteristic.

6. An optimality decision unit comprising:
   input means for receiving plurality of input signals, said plurality of input signals representing in combination a predetermined characteristic of a subject controlled by a plurality of actuators;
   means for determining at least two different features relating to different presentations of a state of said predetermined characteristic of said subject based on said plurality of input signals;
   means for judging if the state of said predetermined characteristic is satisfactory on the basis of said two different features and for determining manipulated variables of said plurality of actuators as a result of the judging; and
   output means for outputting control signals to said plurality of actuators on the basis of said determined manipulated variables.

* * * * *